US011281622B2

(12) United States Patent
Yamamoto

(10) Patent No.: US 11,281,622 B2
(45) Date of Patent: *Mar. 22, 2022

(54) INFORMATION PROCESSING DEVICE, INFORMATION PROCESSING METHOD, PROGRAM, AND STORAGE MEDIUM

(71) Applicant: Rakuten Group, Inc., Tokyo (JP)

(72) Inventor: Yoji Yamamoto, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 423 days.

This patent is subject to a terminal disclaimer.

(21) Appl. No.: 16/343,475

(22) PCT Filed: Oct. 20, 2016

(86) PCT No.: PCT/JP2016/081143
§ 371 (c)(1),
(2) Date: Apr. 19, 2019

(87) PCT Pub. No.: WO2018/073941
PCT Pub. Date: Apr. 26, 2018

(65) Prior Publication Data
US 2019/0266126 A1 Aug. 29, 2019

(51) Int. Cl.
*G06F 16/00* (2019.01)
*G06F 16/11* (2019.01)
*G06F 16/174* (2019.01)
*G06F 16/901* (2019.01)
*G06F 16/958* (2019.01)
(Continued)

(52) U.S. Cl.
CPC ............ *G06F 16/113* (2019.01); *G06F 12/00* (2013.01); *G06F 13/00* (2013.01); *G06F 16/125* (2019.01); *G06F 16/1744* (2019.01); *G06F 16/9017* (2019.01); *G06F 16/958* (2019.01); *G06F 16/972* (2019.01)

(58) Field of Classification Search
None
See application file for complete search history.

(56) References Cited

U.S. PATENT DOCUMENTS 9,396,131 B1 * 7/2016 Hendry ................. G06F 3/0608
2011/0082842 A1 * 4/2011 Groseclose, Jr. ....... G06F 3/067
707/693
(Continued)

FOREIGN PATENT DOCUMENTS

JP 2002-132546 A 5/2002
JP 2007-328750 A 12/2007
(Continued)

OTHER PUBLICATIONS

U.S. Appl. No. 16/343,459, Yoji Yamamoto, filed Apr. 19, 2019.
(Continued)

*Primary Examiner* — Anhtai V Tran
(74) *Attorney, Agent, or Firm* — Sughrue Mion, PLLC

(57) ABSTRACT

An information processing device obtains a first index value which indicates a popularity degree of a blog containing one or a plurality of articles, obtains, for each of the plurality of articles contained in the blog, a second index value which indicates an accessibility to the article, and determines whether or not to compress the article contained in the blog based on the first index value and the second index value.

9 Claims, 15 Drawing Sheets

(51) Int. Cl.
*G06F 12/00* (2006.01)
*G06F 13/00* (2006.01)

(56) References Cited

U.S. PATENT DOCUMENTS

| 2012/0124016 A1* | 5/2012 | Barsness | G06F 16/1744 |
| | | | 707/693 |
| 2012/0198059 A1* | 8/2012 | Clary | G06F 16/958 |
| | | | 709/224 |

FOREIGN PATENT DOCUMENTS

| JP | 2008-176616 A | 7/2008 |
| JP | 2010-044468 A | 2/2010 |

OTHER PUBLICATIONS

U.S. Appl. No. 16/343,478, Yoji Yamamoto, filed Apr. 19, 2019.
International Search Report for PCT/JP2016/081142, dated Jan. 10, 2017.
International Search Report for PCT/JP2016/081143, dated Jan. 10, 2017.
International Search Report for PCT/JP2016/081144, dated Jan. 10, 2017.

* cited by examiner

FIG. 4

MANAGING DB 53

| BLOG ID | USER INFORMATION | BLOG MANAGING INFORMATION | BLOG ACTUAL-ACHIEVEMENT INFORMATION | SIZE INFORMATION | DETERMINATION INFORMATION | COMPRESSION AND DECOMPRESSION INFORMATION | COMPRESSED ARTICLE TAG | ... |
|---|---|---|---|---|---|---|---|---|
| | | | | | | | | |
| | | | | | | | | |
| | | | | | | | | |
| | | | | | | | | |
| | | | | | | | | |

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2016/081143 filed Oct. 20, 2016.

TECHNICAL FIELD

The present disclosure relates to an information processing device, an information processing method, a program, and a storage medium, and more specifically, to technologies suitably applicable to a server device that manages a blog.

BACKGROUND ART

An example known service utilizing the Internet is a service that provides a blog environment. A user uploads an article that contains arbitrary sentences and images as a blog to a server, and the uploaded information is stored as a written article of the user. The stored blog is opened to the public in the form of, generally, a webpage. Moreover, the range to be opened to the public may be limited, or the blog is not opened to the public at all, and the like.

Many users utilize such a blog service as a tool for an own information dispatch, or as an alternative for a private diary.

Patent Literature 1 discloses a technology relating to a blog, e.g., a technology relating to an upload of an article.

Patent Literature 2 discloses a technology relating to a contents deletion in accordance with the insufficient remaining capacity of a server.

CITATION LIST

Patent Literatures

Patent Literature 1: JP 2007-328750 A
Patent Literature 2: JP 2010-44468 A

SUMMARY OF INVENTION

Technical Problem

Many blogs can be launched at no charge, and there are a large number of users who tentatively launch a blog but hardly update. In contrast, there are users who frequently update articles and gain in popularity. Hence, there are various types of users. Accordingly, the number of accesses for each blog and for individual article varies broadly.

For example, there is a blog such that a user launched this blog and updated several articles but not updated or logs in afterward, and left as it is for a long time without any access. Such a blog may be unnecessary for the user, and wastes, in particular, a storage resource of a service provider that provides the blog service.

Hence, articles that have a low accessibility may be compressed, and may be decompressed and distributed when an access is made.

However, compressing and decompressing processes have a high process load. The necessity of a decompression when an access is made may decrease a performance possibly at the time of viewing such that a viewing user feels a delay in page accessing due to such a process time. In view of the foregoing, it is preferable to reduce the number of compressing and decompressing processes as much as possible.

Therefore, an objective of the present disclosure is to accomplish a selection of an appropriate article to be compressed, a reduction of compressing and decompressing processes as much as possible, and an effective utilization of a storage resource.

Solution to Problem

An information processing device according to the present disclosure includes: a first obtaining unit that obtains a first index value which indicates a popularity degree of a blog containing one or a plurality of articles; a second obtaining unit that obtains, for each of the plurality of articles contained in the blog, a second index value which indicates an accessibility to the article; and a determining unit that determines whether or not to compress the article contained in the blog based on the first index value and the second index value.

An article that has a low accessibility (e.g., an unpopular article) among the articles contained in a blog is to be compressed. In this case, a determination on whether or not to compress is made in consideration of whether the article that has a low accessibility is an article in a popular blog or an article in an unpopular blog.

The above-described information processing device may include a compressing and decompressing unit which compresses the article determined by the determining unit as to be compressed, and which decompresses the already-compressed article when an access is made to the already-compressed article.

This compressing and decompressing unit compresses the appropriate article selected in accordance with the determination by the determining unit. Moreover, even if the article is compressed as being determined that the accessibility is low, an access thereto may sometimes occur. In such a case, execution of the decompressing process appropriately provides the article to the accessing user.

In the above-described information processing device, the determining unit may determine whether or not to decompress the already-compressed article based on the first index value and on the second index value.

Regarding the article that has been once compressed, the first and second index values are subsequently obtained periodically or irregularly, and thus a change in accessibility is checked. When the accessibility is increasing in the latest situation, the article is determined as to be decompressed.

In the above-described information processing device, the determining unit may determine whether or not to decompress the already-compressed article based on contents of the article.

For example, as the contents of the compressed article, an article that contains a certain set keyword or a current-news word, an article for a specific theme, etc., are picked out, and those articles are to be decompressed.

In the above-described information processing device, the determining unit may monitor a change in the popularity degree of the blog, and when an increasing tendency of the popularity degree for a given blog is detected, may determine all of or some of the already-compressed articles in the blog as the articles to be decompressed.

When a given blog has the number of accesses keenly increased because of a certain popular article, the other article contained in this blog has the increasing possibility such as to be accessed in future even if not accessed so far. Hence, the determination to decompress is made.

In the above-described information processing device, when the compressed article is decompressed in accordance with an access, the determining unit may determine that the decompressed article is not the article to be compressed for a predetermined time period from the decompression.

That is, the article that is decompressed at the time of access is left as being decompressed for the predetermined time period.

In the above-described information processing device, the first index value may be a value obtained based on at least one of the followings: a total number of page views for the entire blog; a number of unique users who have accessed the blog; a total linked number set to the blog; a total number of comments described in the blog; a value that indicates a page ranking of the blog; a value that indicates an increasing tendency of the page view for the entire blog; and a value that indicates an increasing tendency of a data amount for the entire blog.

These values are likely to be values in accordance with the popularity degree of the entire blog.

In the above-described information processing device, the second index value may be a value obtained based on at least one of the followings: a number of page views for each article; a number of unique users who have accessed the article; a linked number set to the article; a value that indicates a page ranking of the article; a value that indicates an increasing tendency of the page view for the article; a value that indicates a length of a time period at which there is no access to the article; and a value that indicates a presence or absence of a specific phrase.

These values are likely to be values in accordance with the accessibility for each article.

An information processing method according to the present disclosure includes: a step of obtaining a first index value that indicates a popularity degree of a blog which contains one or a plurality of articles; a step of obtaining a second index value that indicates an accessibility to the article for each of the plurality of articles contained in the blog; and a step of determining whether or not to compress the article contained in the blog based on the first index value and on the second index value.

This information processing method enables the information processing device to determine an appropriate article to be compressed.

A program according to the present disclosure is a program that causes an information processing device to execute procedures corresponding to the above-described steps. A storage medium according to the present disclosure has stored therein the program. Those accomplishes the above-described processes of the information processing device.

Advantageous Effects of Invention

According to the present disclosure, a storage-resource tightness is suppressed by compression of an article, and an appropriate article to be compressed is selectable within a blog so as to reduce the opportunities for compressing and decompressing processes as much as possible, thereby achieving a reduction of a process load on a server and an improvement of a performance at the time of viewing.

BRIEF DESCRIPTION OF DRAWINGS

FIG. 4 is an explanatory diagram for a managing database according to the embodiment;

DESCRIPTION OF EMBODIMENTS

Embodiments will be described in the following sequence below.
<1. System Configuration>
<2. Blog Server and Database>
3. First Embodiment
4. Second Embodiment
5. Third Embodiment
6. Fourth Embodiment
7. Fifth Embodiment
8. Sixth Embodiment
<9. Summary and Modified Examples>
<10. Program and Storage Medium>

Note that, in the following description, a term "blog" means a webpage in the form of a diary called a weblog or simply a blog. More specifically, a blog server provides an environment (a storage capacity and a webpage) for forming a blog to a user, and the user uploads, in the form of posting, etc., an article that contains sentences and images to the own blog. A blog server normally provides such an article for a public (or limited range) viewing. However, the blog may be not opened to the public.

The contents of the article are not limited to any particular information. It may be information utilized for the user to information dispatch, or may be a private diary, etc. Moreover, equivalent contents although not called a "blog" are also treated as a blog.

The term "article" is an element which constitutes a blog, and indicates a unit (e.g., a posted unit) formed by sentences and images. The contents thereof are not limited to any particular information. Moreover, the article may be not only a single topic but also a group of articles to be viewed by a single URL for one or a plurality of topics.

Regarding the term "user", a user as a describer who writes an article in the own blog (a so-called blogger), and a user as an audience who views the other person's or own blog are expected. Those users are distinguished and referred to as the "describer" and the "audience". Needless to say, it is normally expected that a user may be a describer at a given time point but may become an audience at another time point.

A term "compression" means a so-called data compression, and is to convert various data, such as text data and image data, into another data that has decreased data amount while maintaining the substantial characteristics of the data.

A term "decompression" is to return the compressed data to the status before the compression. However, a case in which data does not completely return to the status before the compression like a case in which a so-called lossy compression is executed at the time of the compression is also involved. In this specification, an action to make at least the contents of the article viewable is called the "decompression".

1. System Configuration

Figure 1:
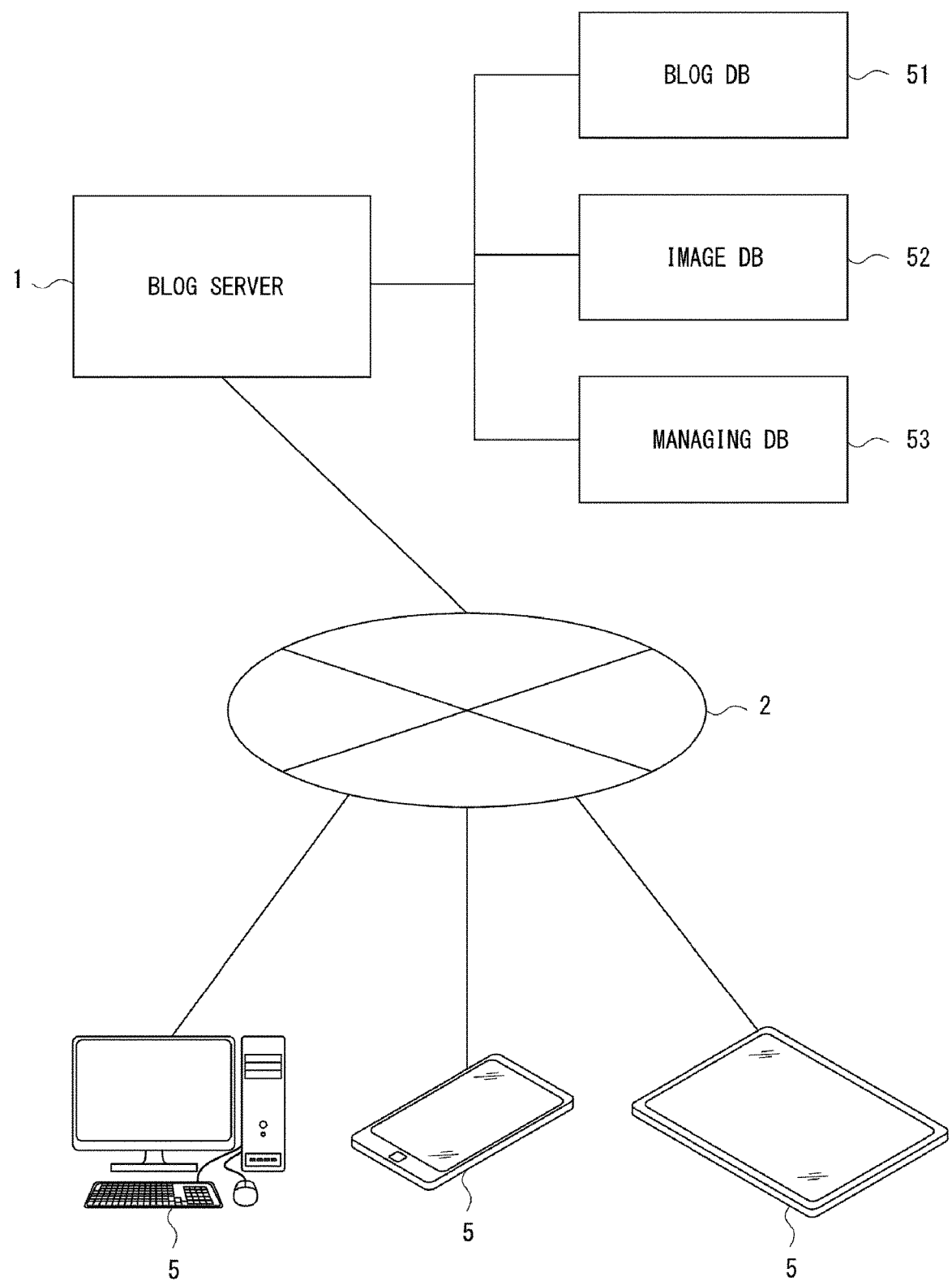
FIG. 1 is an explanatory diagram for a network that includes a blog server according to an embodiment of the present disclosure.

FIG. 1 illustrates an example structure of a network system that includes a blog server 1 according to an embodiment.

According to the network system of this embodiment, a blog server 1 and a plurality of user terminals 5 are connected together so as to be mutually communicable via a network 2.

Moreover, the blog server 1 is accessible to various databases. Note that the term "database" will be referred to as "DB" below. In the figure, a blog DB 51, an image DB 52, and a managing DB 53 are illustrated as the DBs to which the blog server 1 is accessible.

Regarding the structure of the network 2, various structures are expectable. For example, the Internet, an intranet, an extra network, a Local Area Network (LAN), a Community Antenna TeleVision (CATV) communication network, a Virtual Private Network (VPN), a telephone network, a mobile communication network, a satellite communication network, etc., are expectable.

Moreover, regarding a transmission medium that constitutes all of or a part of the network 2, various examples are also expectable. For example, wired schemes, such as Institute of Electrical and Electronics Engineers (IEEE) 1394, a Universal Serial Bus (USB), a power line transmission or a telephone line, or, wireless schemes, such as infrared ray like Infrared Data Association (IrDA), Bluetooth (registered trademark), 802.11 wireless communication, a mobile phone network, a satellite connection, or a terrestrial digital network, are applicable.

The blog server 1 is an information processing device utilized by an organization that manages and runs the blog service for the users. The blog server 1 provides a blog environment to the user (describer) and distributes webpage data like a blog article page to the user (audience) in response to an access request.

More specifically, for the describer who wants to open a blog, a webpage as the describer's blog is set, and user information is registered, and the like. For the describer who has already launched the blog, the article posted by the describer is stored.

Moreover, in response to the access request from the user who is a general audience, the webpage data corresponding to the related webpage is distributed.

This blog server 1 is equivalent to an embodiment of the information processing device as recited in the claims.

The user terminal 5 is a terminal utilized by the user as the describer or the audience. An example user terminal 5 is a Personal Computer (PC) with a communication function, a feature phone, a Personal Digital Assistant (PDA) or a smart device, such as a smartphone or a tablet terminal.

The user terminal 5 executes various kinds of transmitting and receiving processes, display processes, etc., as needed.

The audience is capable of arbitrarily viewing the interesting blog via a web browser on the user terminal 5.

The describer is capable of accessing and viewing the own blog page, and posting a new article via the user terminal 5.

The user terminal 5 is to execute a communicating process, a display process, etc., for these operations.

Figure 2:
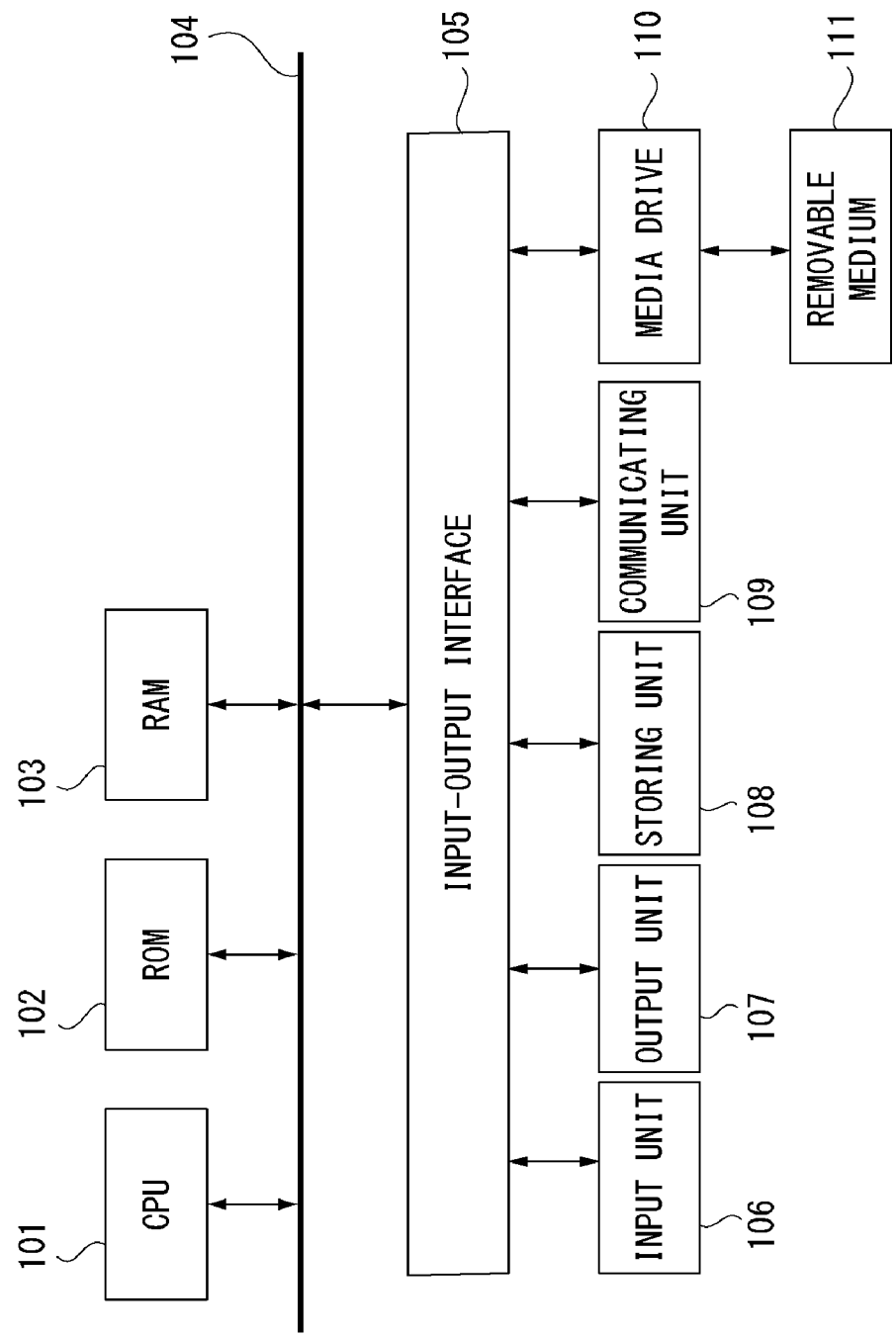
FIG. 2 is a block diagram of a computer apparatus that can be utilized in the embodiment.

FIG. 2 illustrates a hardware configuration of the information processing device that constructs the blog server 1 or the user terminal 5 as illustrated in FIG. 1. Each device illustrated as the blog server 1 or the user terminal 5 is achieved by a computer apparatus as illustrated in FIG. 2 and the computer apparatus is capable of an information processing and information communication.

In FIG. 2, a Central Processing Unit (CPU) 101 of the computer apparatus executes various kinds of processes in accordance with a program stored in a Read-Only Memory (ROM) 102 or a program loaded in a Random Access Memory (RAM) 103 from the storing unit 108. The RAM 103 also stores, as needed, necessary data, etc., for the CPU 101 to execute various kinds of processes.

The CPU 101, the ROM 102, and the RAM 103 are mutually connected with each other via a bus 104. An input-output interface 105 is also connected to this bus 104.

An input unit 106, an output unit 107, the storing unit 108, and a communicating unit 109 are connected to the input-output interface 105.

The input unit 106 includes, for example, a keyboard, a mouse, and a touch panel.

The output unit 107 includes, for example, a display, such as a Liquid Crystal Display (LCD), a Cathode Ray Tube (CRT), an organic ElectroLuminescence (EL) panel, and a speaker.

The storing unit 108 includes, for example, a Hard Disk Drive (HDD), or a flash memory device.

The communicating unit 109 executes a communicating process and a device-to-device communication via the network 2.

A media drive 110 is also connected to the input-output interface 105, as needed. A removable medium 111, such as a magnetic disk, an optical disk, a magneto-optical disc, or a semiconductor memory, is loaded as needed, and information is written or read relative to the removable medium 111.

According to such a computer apparatus, data and programs are uploaded or downloaded via the communication by the communicating unit 109. Moreover, data and programs can be exchanged via the removable medium 111.

The CPU 101 that executes processing operations in accordance with the various programs achieves execution of necessary information processing and communication as the blog server 1 or as the user terminal 5.

Note that the information processing device that constitutes the blog server 1 or the user terminal 5 is not limited to a structure constructed by a single computer apparatus as illustrated in FIG. 2, but may employ a structure in which a plurality of computer apparatuses constructs a system. The plurality of computer apparatuses may construct a system via a LAN, etc., or may be placed at remote sites via a VPN, etc., that utilizes the Internet. The plurality of information processing devices may include a group of servers (cloud) that is available by cloud computing service.

2. Blog Server and Database

Figure 3:
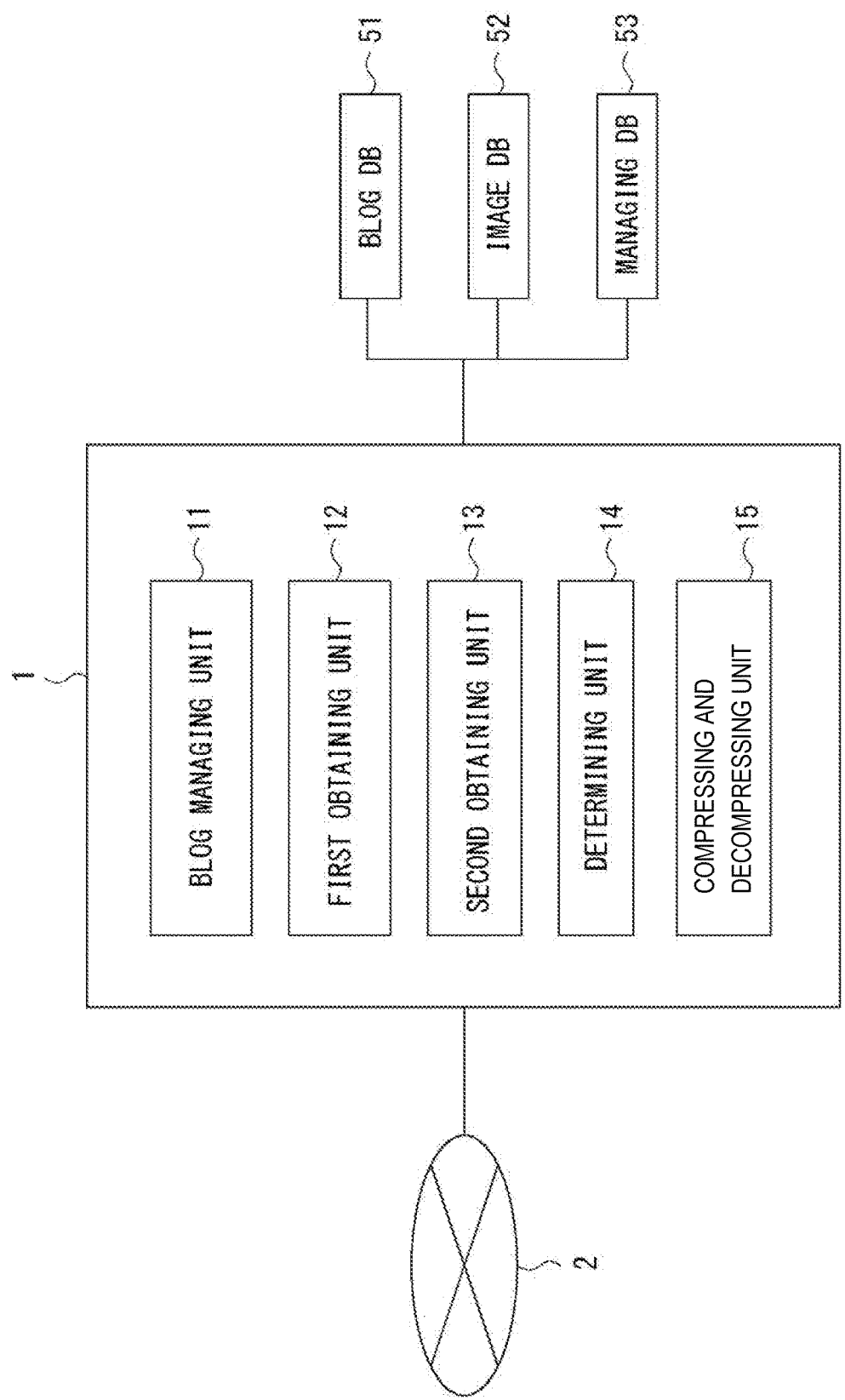
FIG. 3 is an explanatory diagram for a functional configuration of the blog server according to the embodiment.

FIG. 3 illustrates a functional configuration of the blog server 1 constructed by the one or plurality of information processing devices, and various kinds of DBs.

Each function as the blog server 1 is achieved by the process executed by the CPU 101 in the information processing device in accordance with the program. However, all of or a part of a process by each structure to be described below may be achieved by hardware.

Moreover, when each function is achieved by a software, it is unnecessary that each function is achieved by individual program. A single program may execute a plurality of functional processes, or a single function may be achieved by a cooperative operation by a plurality of program modules.

Moreover, each function may be distributed to the plurality of information processing devices. Furthermore, a single function may be achieved by the plurality of information processing devices.

As illustrated in the figure, the blog server 1 includes functions as a blog managing unit 11, a first obtaining unit 12, a second obtaining unit 13, a determining unit 14, and a compressing and decompressing unit 15.

The blog managing unit 11 executes necessary processes as a server that provides the blog service. For example, this unit provides the blog environment to the user, manages information on the user as the describer, stores and manages the created blog, manages information on each blog, and distributes the webpage of the blog (article) in accordance with the access request, and the like.

Moreover, the blog managing unit 11 updates and reads the information in the managing DB 53 as needed.

The first obtaining unit 12 executes a process of obtaining a first index value which is information utilized when a determination on whether or not to compress an article in a blog is made and which indicates a popularity degree of the blog.

Example first index values for a blog are the total number of page views for the entire blog, the number of unique users who have accessed the blog, the total linked number set for the blog, the total number of comments described in the blog, the page ranking of the blog, the value that indicates an increasing tendency of the page view for the entire blog, the value that indicates an increasing tendency of a data amount for the entire blog, and the number of clicks to an advertisement provided in the blog.

Similarly, the second obtaining unit 13 executes a process of obtaining a second index value which is information utilized when a determination on whether or not to compress an article in a blog is made and which indicates an accessibility to the article, for each of the plurality of articles in the blog.

Example second index values are the number of page views for each article, the number of unique users who have accessed the article, the linked number set for the article, the value that indicates the page ranking of the article, the value that indicates an increasing tendency of the page view for the article, the value that indicates a length of a time period at which there is no access to the article, the number of clicks to an advertisement provided together with the article, and the value that indicates a presence or absence of a specific phrase.

The determining unit 14 executes a process of determining whether or not to compress the article contained in the blog based on the first index value and on the second index value.

Moreover, the determining unit 14 executes, for the compressed article, a process of determining whether or not to decompress based on the first and second index values, determining whether or not to decompress based on the contents, and determining whether or not to decompress based on the popularity tendency of the blog, etc.

A specific example will be described later as a process in each embodiment.

The compressing and decompressing unit 15 executes a process of compressing the article determined as to be compressed by the determining unit 14.

Moreover, the compressing and decompressing unit 15 executes a decompressing process to the compression when an access is made to the already-compressed article.

Furthermore, the compressing and decompressing unit 15 executes a process of decompressing the already-compressed article determined as to be decompressed by the determining unit 14.

FIG. 3 illustrates the blog DB 51, the image DB 52, and the managing DB 53 that are DBs to which the blog server 1 accesses.

The blog DB 51 stores the blog data for each describer. The webpage data of each blog is stored, and the article is added for each blog in accordance with the describer's posting.

The data on the webpage that forms the blog is structured document files, such as HyperText Markup Language (HTML) and Extensible HyperText Markup Language (XHTML). Described in the structured document files are text data for the article posted by the describer, specifying information for image data on various images, the layout thereof, and the display scheme thereof (e.g., a letter color, a font, a size, and a decoration).

Moreover, the audience can also post a comment to the blog. Data on such a comment from such an audience is also stored in the blog DB 51 in association with the blog and each article therein.

When there is the access request to a certain blog from the user terminal 5, the blog server 1 reads the requested blog page from the blog DB 51, and distributes the read information to the user terminal 5.

The image DB 52 stores the image data (still image data or motion image data) attached to the blog.

Although an image can be attached to the article in the blog, for example, article data and specifying information (link information) on the image corresponding to the article data are stored in the blog DB 51. Moreover, the image data itself is stored in the image DB 52.

In the case of an access request to the blog article to which the image is attached, the webpage data is displayed by the browser on the user terminal 5, but at this time, the user terminal 5 requests the image data to the blog server 1 in accordance with the link setting on the webpage. The blog server 1 reads image data from the image DB 52 in accordance with the request, and distributes the image data to the user terminal 5. Hence, a blog article with the image is displayed on the user terminal 5.

Note that this is merely an example, and the webpage data that contains the image data in advance may be stored in the blog DB 51.

The managing DB 53 stores information for managing each blog.

An example of the details of the managing DB 53 will be illustrated in FIG. 4.

A blog Identification (ID) is set for each blog, and the accompanying information is managed based on the blog ID. For example, user information, blog managing information, blog actual-achievement information, size information, determination information, compression and decompression information, a compressed article tag, etc., are updated and managed as needed for each blog (the blog ID).

The user information is information on the user (blog operator) as the describer who has launched the blog. For example, user information includes a user ID, a login password as the operator, attribute information, such as a user's address, a name and age, and information on a login date and time as the operator.

The blog managing information is the attribute information on the blog itself. For example, such information contains the Uniform Resource Locator (URL) of the blog, genre information on the blog, the blog launched date and time, the number of articles in the blog, update date and time information, layout information on the blog, and link setting information.

Regarding the blog actual-achievement information, information that indicates the popularity of the blog, and information that indicates an accessibility to each article are stored. That is, the above-described first and second index values are stored.

Accordingly, the information (the first index value) that indicates the popularity of the blog, such as the total number of page views, the number of accessed unique users, the total linked number, the total number of comments, the page ranking of the blog, the value that indicates the increasing tendency of the page view for the entire blog, the value that indicates the increasing tendency of the data amount for the entire blog, and the number of clicks to the advertisement, are updated as needed.

These values become values in accordance with the popularity degree of the entire blog, and are suitable as the first index value.

Moreover, as the blog actual-achievement information, information (the second index value) that indicates the accessibility of each article is stored in association with each article. Examples are the number of page views for each article, the number of accessed unique users, the linked number, the value that indicates the page ranking of the article, the value that indicates the increasing tendency of the page view of the article, the value that indicates the length of a time period at which there is no access to the article, and the value that indicates the presence or absence of a specific phrase.

These values become values in accordance with the accessibility for each article, and are suitable as the second index value.

The size information is information on the data size of the entire blog. Moreover, the size information on each article may be stored. The size information is updated in accordance with the update of the blog.

Note that the data size stored in the blog DB 51 as the size information and the data size of the image data stored in the image DB 52 may be collectively managed, or may be separately and individually managed.

The determination information is information on whether or not to compress which is determined by the determining unit 14 for each article based on the first index value and the second index value. Moreover, the information on whether or not to decompress which is determined by the determining unit 14 for the compressed article is also included. That is, this is the information that indicates compression permitted or unpermitted, and decompression permitted or unpermitted. These are updated as, for example, flag data.

Note that the flags that indicates compression permitted or unpermitted, and decompression permitted or unpermitted serve as information indicating that the compression and the decompression should be executed in the subsequent compressing process and decompressing process. Therefore, these flags may be cleared when the compression and the decompression are executed.

Moreover, the determination information may contain information on the determination result of the popularity degree of the blog.

The compression and decompression information indicates, for each article in the blog, an execution status of compression or decompression, such as original status, compressed status, or decompressed status from the compression. It is appropriate if the compression and decompression information is defined as status information to identify the status.

Moreover, the execution date and time of the compression or the decompression is also stored as past-record information on the compression or the decompression.

The compressed article tag is set in accordance with the contents for each article.

For example, a phrase like a keyword that appears in the article, a current-news phrase, and a genre of the article are set and registered as the tag. For example, when the compression is executed, the tag in accordance with the contents of the article is created, and is registered as the compressed article tag.

Each of the above-described DB s (the blog DB 51, the image DB 52, and managing DB 53) may be achieved in any form as long as the blog server 1 is accessible. For example, all of each DB may be formed in a storing unit within the same system as the blog server 1, or a part of or all of the respective DBs may be separately formed and provided in a computer system at a remote site. Needless to say, it is unnecessary that each DB is formed within the single device (e.g., a single HDD). Moreover, it is unnecessary that each DB is constructed as the single DB. For example, information stored as the managing DB 53 may be stored and managed by a plurality of DBs (e.g., a DB for managing a user relating to a blog, and a DB for managing the blog). Each of the above-described DBs are merely presented as an example in which the storing unit for the information relating to the process in the embodiment is constructed in the form of a single DB.

3. First Embodiment

An example process as a first embodiment which is executed by the blog server 1 will be described.

Presently, although a blog can be easily started by general users, there is a user who loses the interest after uploading several articles, or there is a user who maintains the interest for a long time. Moreover, there is a popular blog with many accesses, and there is a blog that has almost no audience.

It is necessary for the blog server 1 to maintain the blogs for those various users without prejudice, but because of this reason, the storage resource load is likely to become large.

Hence, according to this embodiment, the blog server 1 compresses and stores the article that has a low accessibility. When an access is made to the compressed article, such an article is decompressed and distributed.

However, since the compressing process and the decompressing process also need a certain process load, it is desirable not to execute such processes so frequently. Moreover, decompression of the compressed article and distribution of such an article increase a response time together with the process load, and thus there is a possibility such that the user feels a reduction in performance. Hence, it is desirable to avoid an occurrence of access to the compressed article as much as possible.

Hence, according to this embodiment, the article that has a low accessibility is further surely selected for the compression.

Figure 5:
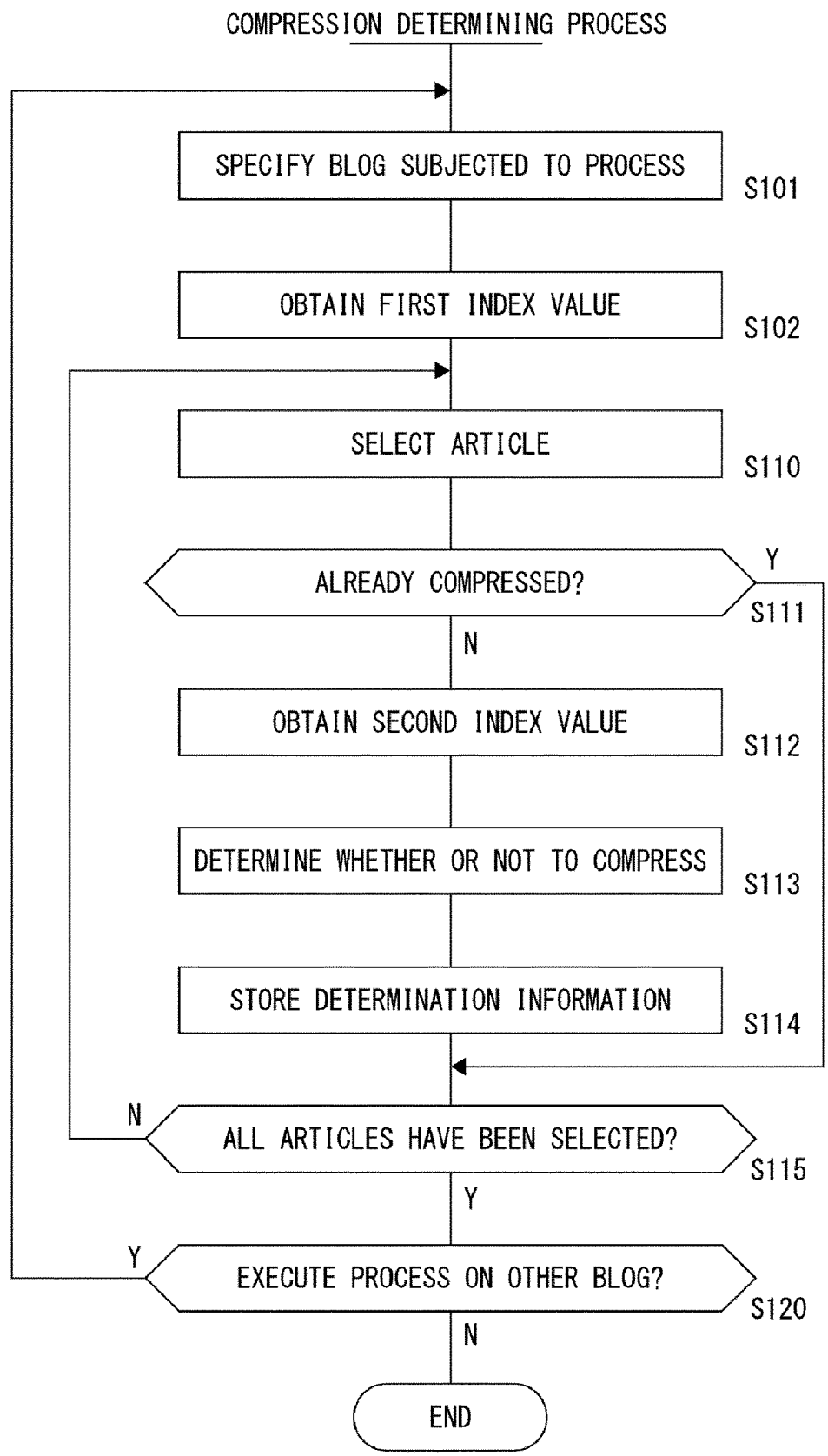
FIG. 5 is a flowchart of a compression determining process according to a first embodiment.

FIG. 5 illustrates an example compression determining process executed by the blog server 1.

Note that the processes illustrated by the flowcharts from FIG. 5 up to FIG. 15 to be described later are processes executed by the functions of the blog server 1 which are the blog managing unit 11, the first obtaining unit 12, the second obtaining unit 13, the determining unit 14, and the compressing and decompressing unit 15 as illustrated in FIG. 3.

The blog server 1 executes the compression determining process in FIG. 5 as needed on all of or some blogs that are stored in the blog DB 51. This is a process of determines whether or not to compress for each article.

The blog server 1 specifies, in step S101, one blog subjected to the compression determining process. For example, the one blog may be selected in sequence.

The blog server 1 obtains, in step S102, the first index value for the blog subjected to the process. For example, the first index value contained in the blog actual-achievement information stored for this blog (the blog ID) is read from the managing DB 53.

More specifically, all of or some of the total number of page views for the blog, the number of accessed unique users, the total linked number, the total number of comments, the page ranking of the blog, the value that indicates the increasing tendency of the page view for the entire blog, and the value that indicates the increasing tendency of the data amount for the entire blog, etc., are read. Next, those are taken as a source to measure the popularity degree of the blog.

Next, the blog server 1 executes processes in steps S110 to S115 in order to determine, for each article in the blog, whether or not to compress.

First, the blog server 1 selects, in the step S110, one article in the blog.

The blog server 1 checks, in the step S111, whether or not the selected article has been already compressed. This can be can be carried out by referring to, for example, the compression and decompression information in the managing DB 53.

When the article has been already compressed, since the determination on whether or not to compress is unnecessary, the process progresses to the step S115. It is checked, in the step S115, whether or not the process has been completed for all the articles, and when not completed, the process returns to the step S110 and selects the next article.

Note that all the articles in the step S115 mean all the articles subjected to the process at this time. It may be all the articles in a blog, or may be some articles (e.g., the article posted in a specific time period) in a blog.

When the article selected in the step S110 as to be subjected to the process is the article that has not been compressed yet, the blog server 1 progresses the process to step S112 from the step S111, and obtains the second index value for this article. For example, the information on the article contained in the blog actual-achievement information stored for the blog is read from the managing DB 53. For example, the number of page views for the article, the number of accessed unique users, the linked number, the value that indicates the page ranking of the article, the value that indicates the increasing tendency of the page view for the article, the value that indicates the length of a time period at which there is no access to the article, and the number of clicks to the advertisement provided together with the article, etc., are read.

Next, the blog server 1 determines, in step S113, whether or not to compress the article. In this case, a determination is made on whether the accessibility is high or low. When the accessibility is high, the article is determined as not to be compressed, and when the accessibility is low, the article is determined as the article that can be compressed (or as the article that should be compressed).

The blog server 1 executes this determination based on the first index value obtained in the step S102, and on the second index value obtained in the step S112.

More specifically, whether or not to compress is not determined by the accessibility of the article itself only, but the popularity degree of the blog is determined based on the first index value, and the determination on which the popularity degree determination is reflected is made on whether or not to compress.

For example, the popularity degree of the blog itself is first determined based on the first index value. For example, the popularity degree is classified into any of multiple classes based on the number of page views. For example, the classification may be two classes like "popular/unpopular", or may be three classes like "popular/ordinary/unpopular". Moreover, the popularity level may be classified into equal to or greater than four levels.

Such a determination result on the popularity degree is reflected, the index for the accessibility of the article is checked, and whether or not to compress is determined.

For example, the first index value is set to the total number of page views (PV), and a determination is made such that when:

| PV is 0 to 10000 | Unpopular blog; |
| PV is 10001 to 1000000 | Ordinary blog; and |
| PV is equal to or greater than 1000001 | Popular blog. |

The second index value is set to the value that indicates the length of a time period at which there is no access, and a determination is made such that:

Unpopular blog compressed if the time period without an access is equal to or longer than one year;

Ordinary blog compressed if the time period without an access is equal to or longer than three years; and Popular blog compressed if the time period without an access is equal to or longer than five years.

As described above, the popularity degree of the blog is first determined, and the determination reference on whether or not to compress based on the accessibility is adjusted in accordance with the popularity degree.

This enables a determination on whether or not to compress the article that is not accessed frequently in consideration of the popularity degree of the blog itself.

For example, with a time period at which there is no access to the article like "the time period at which there is no access to the article continues for equal to or longer than three years" being index value, and the article that has the index value which satisfies a certain condition may be compressed. In this case, however, it is not always true that the accessibility is properly determined.

For example, regarding the article that has no access at all for three years among the multiple articles in the blog that is popular as a whole, and the article that has no access at all for three years among the multiple articles in the blog that is unpopular as a whole, the former article may have a higher possibility to be accessed next. That is, it is difficult to further properly determine the actual accessibility by only the index of the accessibility of the article. In other words, the determination on the article to be compressed with the popular blog and the unpopular blog being under the same condition is not always suitable in view of a desire to reduce opportunities for compression and decompression as much as possible.

Accordingly, the blog server 1 determines, in the step S113, whether or not to compress based on the index that is the accessibility of the article on which the popularity degree of the blog is reflected.

Note that other indexes may be adopted as the second index value that indicates the accessibility. For example, the second index value is set to the number of unique users UN for each article, and a determination is made such that:

| | |
|---|---|
| Unpopular blog | compressed if UN < UN1; |
| Ordinary blog | compressed if UN < UN2; and |
| Popular blog | compressed if UN < UN3. |

However, UN1>UN2>UN3.

Accordingly, the unpopular article in an unpopular blog becomes likely to be determined as to be compressed in comparison with the unpopular article in a popular blog.

Although the number of unique users is described as an example, the above-described other index values are similarity applicable.

The blog server 1 stores, in step S114, the determination result on whether or not to compress the article as the determination information. For example, the flag that indicates compression permitted or unpermitted stored in the managing DB 53 as the determination information for the article is updated or maintained.

When the determination on whether or not to compress one article completes through the above procedures, the blog server 1 checks, in step S115, whether or not the determination has completed for all the articles subjected to the process at this time for the blog subjected to the process presently, and when not completed yet, returns the process returns to the step S110, and the next article is selected. Subsequently, the steps S111 to S114 are executed.

Note that the determination on the popularity degree of the blog using the first index value may be executed only when the step S113 is executed initially for the blog, and the determination result may be held until the process progresses from the step S115 to the step S120. Alternatively, the process of determining the popularity degree of the blog using the first index value may be once executed immediately after the step S102.

When the determination on whether or not to compress has completed for all the articles subjected to the process at this time in a certain blog, it is checked, in step S120, whether or not subsequently execute the process on the other blog. When the similar process is to be executed on the other blog, the process returns to the step S101, the other blog is specified as the blog subjected to the process, and then the similar process is executed.

When, for example, the process has been completed for all the blogs subjected to the process at this time, the compression determining process in FIG. 5 is terminated from the step S120.

The blog server 1 executes such a compression determining process as illustrated this in FIG. 5 as needed. For example, the process may be executed for all the blogs stored in the blog DB 51 periodically. This causes each blog to be determined whether or not each article should be compressed, and the determination information is stored in the managing DB 53.

Note that it is desirable for each blog to execute the compression determining process as illustrated in FIG. 5 not only once at a certain time but also repeatedly for a certain time period. This is because it is expected that the accessed situation for the article changes moment by moment, and the article that has no access for equal to or longer than a predetermined time period may occur.

Figure 6:
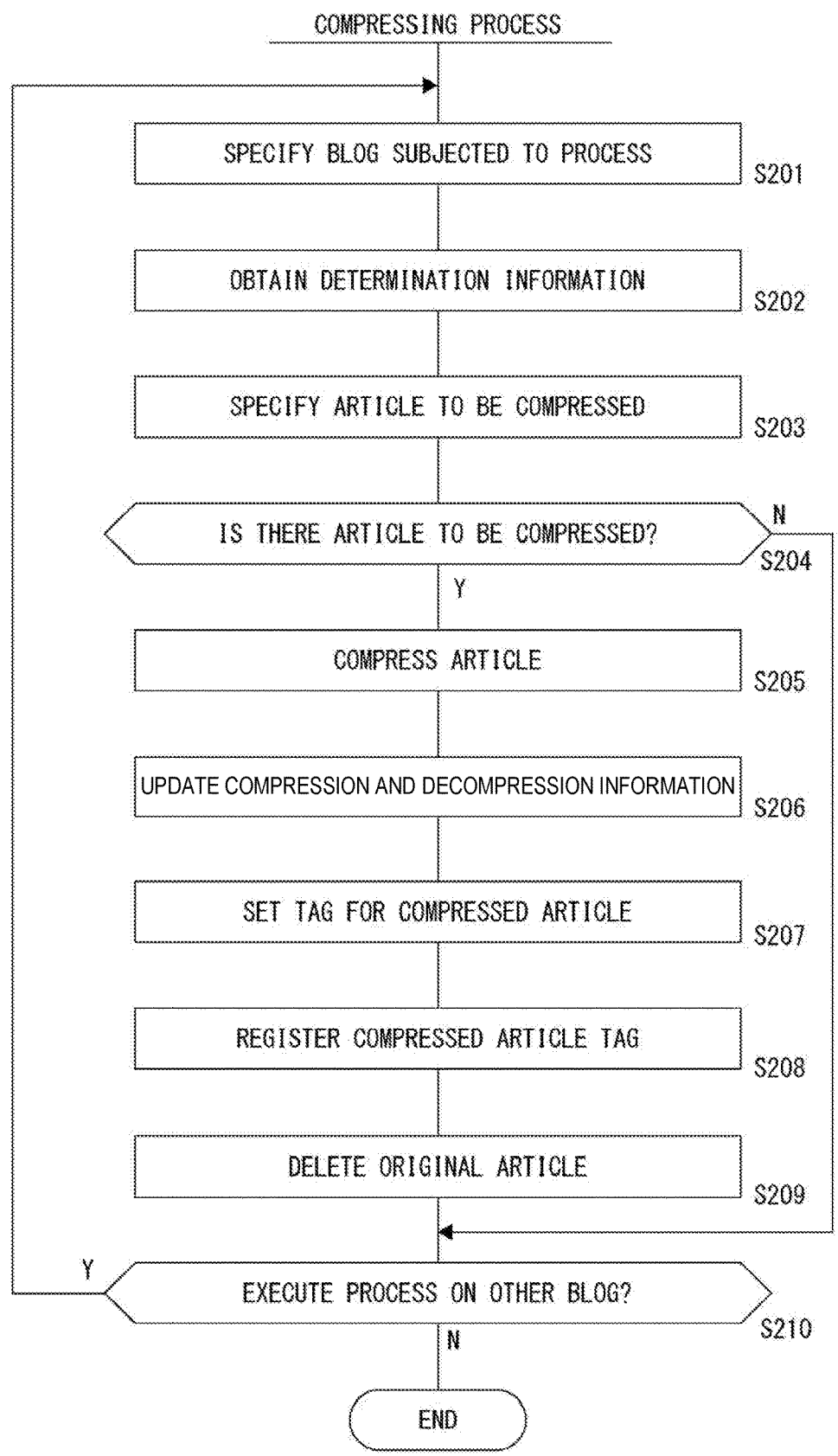
FIG. 6 is a flowchart of a compressing process according to the first embodiment.

The blog server 1 executes the above compression determining process as appropriate, and executes the compressing processes as illustrated in FIG. 6 as appropriate. For example, the compressing process is periodically executed for all or some blogs.

As the compressing process in FIG. 6, first, the blog server 1 specifies, in step S201, one blog subjected to the process.

The blog server 1 obtains, in step S202, the determination information on the blog specified as being blog subjected to the process. That is, this is the determination information stored in the managing DB 53 in association with the blog ID of this blog. More specifically, this is, for example, a process of checking the flag information that indicates whether or not to compress for each article stored through the compression determining process in FIG. 5.

The determination information enables to check whether or not each article in the blog can be compressed.

Accordingly, the blog server 1 specifies, in step S203, the article that can be compressed as the article to be compressed.

When there is no article that can be compressed in the blog, the blog server 1 progresses the process from the step S204 to step S210, and completes the compressing process on this blog. Subsequently, it is also checked whether or not execute the compressing process for the other blogs. When the compressing process is executed on the other blog, the process returns to the step S201, and the other one blog is specified as the blog subjected to the process.

When there is equal to or greater than one article to be compressed, the blog server 1 progresses the process from the step S204 to step S205, and compresses the articles. That is, the data on the one or the plurality of articles specified in the step S203 is compressed. Next, the article that becomes the compressed data is stored in the blog DB 51 and the image DB 52 in association with the blog.

What compression is to be executed in the step S205 may vary.

First, as the setting for the part to be compressed, i.e., as the kind for which part in the article data is to be compressed, the followings are considerable.

Both the text data and the image data in the article are compressed.

All the text data in the article is compressed.

A part of the text data in the article is compressed.

All the image data in the article is compressed.

A part of the image data in the article is compressed.

According to the compression on both the text data and the image data in the article, a compression effect is enhanced, and thus a reduction effect of a necessary storage capacity is enhanced.

According to the compression on all the text data in the article, depending on the text data amount and a compression percentage, the compression effect (the capacity reduction effect) is enhanced. In particular, this is effective for the blog that has the article contents which are mainly text data.

According to the compression on the part of the text data, a response and a distribution if an access is made after the compression are prompt. For example, the last half part (the part not appear in a first view at the time of viewing) of the blog is compressed. It is expected that the compressed part is decompressed and distributed as will be described later, but since the first view part is not compressed, the data can be promptly (without a decompressing process) distributed to the user terminal 5. Moreover, when the last half part is decompressed and distributed while the first view is being displayed on the user terminal 5, the user feels as if there is no delay in response.

Moreover, the compression on only the text data has advantages such that a process load is little in comparison with a case in which the image data is compressed, and the process time is short.

According to the compression on all the image data in the article, since the part that has a large data amount is compressed, the compression effect (the capacity reduction effect) is enhanced. Regarding the compression on the image data, when the compression that decreases the resolution of the image is executed, the capacity reduction effect is particularly high. When there are multiple pieces of the image data, the compression may be executed on not all the image data but some pieces of the image data.

When some pieces of the image data in the article are compressed, it is appropriate if the image that does not appear in the first view at the time of viewing should be selected and compressed. In that case, when an access is made after the compression, it is appropriate if the image data that does not need a decompression should be distributed first. Hence, the user feels as if there is no delay in response. Next, the subsequent image data may be decompressed and distributed while the first view is being displayed on the user terminal 5.

The above setting for the part to be compressed in the article may be fixed, or may be changed in accordance with a status. For example, an automatic selection may be permitted in accordance with the storage resource status of the blog DB 51 and that of the image DB 52, etc.

When, for example, the resource of the blog DB 51 which can record becomes equal to or lower than a predetermined quantity, the compression on the text data is selected, and when the resource of the image DB 52 which can record becomes equal to or lower than a predetermined quantity, the compression on the image data is selected. When the storable capacities of both the blog DB 51 and the image DB 52 decrease, both the text data and the image data are compressed, etc.

Moreover, the setting for the part to be compressed may be automatically selected for each blog and for each article.

An example of deciding the compressing process details in accordance with the contents of the article is as follows.

When the text data in the article is equal to or larger than a predetermined amount, only the text data is compressed, and when less than the predetermined amount, the text data and the image data are entirely compressed.

When the image data is contained in the article, only the image data is compressed. Furthermore, as an example of selecting the part to be compressed for each blog, a determination is made on whether the blog is mainly a text blog or is mainly an image blog in accordance with a ratio between the text and the image in the entire blog. In the case of the mainly text blog, the text data may be compressed, and in the case of the mainly image blog, the image data may be compressed.

Conversely, when a priority is given to the distribution speed to be felt by the user when an access is made, in the case of the mainly text blog, the image data may be compressed, and in the case of the mainly image blog, the text data may be compressed.

Note that when a motion image is contained as the image data, compression on both the motion image and the sound data, or either one may be selected.

In addition to the above-described setting for a part to be compressed, a setting for a compression scheme is also broadly considerable. Various compression schemes are well known for the image data and for the text data, and the compression percentage is selectable variously. Selection can be also made for lossless compression or for lossy compression.

Regarding to this compression scheme, a certain compression scheme may be fixedly applied, or may be selected in accordance with a status.

When, for example, the resource of the blog DB 51 or that of the image DB 52 which can record becomes equal to or lower than a predetermined amount, the compression scheme may be changed to a compression scheme that has a higher compression percentage.

Moreover, the compression scheme may be automatically selected for each blog and for each article.

For example, the lower the popularity of the blog is, the higher the compression percentage is set, or the compression scheme that has a different compression percentage is selected in accordance with the low accessibility to the article, and the like.

The blog server 1 executes, in the step S205 in FIG. 6, the compressing process on the one or the plurality of articles to be compressed in the blog subjected to the process presently. Along with this compressing process, the determination information on the article having undergone the compressing process, i.e., the information (flag information) that indicates compression permitted is cleared.

Subsequently, the blog server 1 updates, in step S206, the compression and decompression information in the managing DB 53. In this case, for example, the flag information is updated so as to indicate that the compressed article in the blog is in the compressed status. Moreover, a compression past-record is also added.

The blog server 1 sets, in step S207, the tag for each compressed article. The tag in this case is information that indicates a keyword reflecting the contents of the article and, genre information of the article, etc., and is utilizable for searching and pick-out of the article.

By executing the compressing process, for the article after the compression, a text search for such an article becomes not easy. That is, when it is desirable to put the compressed article in the search range, it is necessary to take a time for executing the decompression at the time of searching. Hence, the tag is set and registered.

In this step S207, the blog server 1 picks out a frequently appearing word, picks out a noun by morphological analysis, and obtains the genre information from the original article data before the compression, and sets one or the plurality of phrases to be registered as the tag.

Next, the blog server 1 registers, in step S208, such a tag as a compressed article tag in the managing DB 53. That is, one or the plurality of phrases like a keyword is registered in association with each compressed article.

Note that the setting and registration of the compressed article tag are executed on a given article in the example illustrated in FIG. 6 when this article is compressed, but may be executed on all the articles in advance. In particular, the tag is applied for the article search, and if the tags are registered in advance for all the article, such a tag is applicable as the compressed article tag in this embodiment. Hence, it is unnecessary to execute the steps S207 and S208.

In the case of, however, a system that does not particularly register the tags for all the articles, by registering the compressed article tags in the steps S207 and S208 as illustrated in FIG. 6, the process becomes a minimum-requisite process for the necessary article. Hence, this is advantageous for preventing a process load on the blog server 1 from increasing.

The blog server 1 deletes, in step S209, the data on the original article before the compression for the compressed article. Needless to say, when only a part of the article is compressed, the original data on the compressed part only is deleted.

When the compressing process has been completed for the one blog through the above processes, the blog server 1 checks, in step S210, whether or not to process the other blog.

When the process for all the blogs subjected to the process at this time has been completed, the compressing process in FIG. 6 is terminated from the step S210.

FIG. 6, the actual compressing process is executed on the article determined as compression permitted by the compression determining process in FIG. 5, and the recovery of the storage resource is achieved.

Although the description has been given of a case in which the article determined as compression permitted through the process in FIG. 5 is to be compressed through the process in FIG. 6, it is appropriate if the determination information (e.g., the flag) that is set through the process in FIG. 5 should be reset as needed. For example, the information is reset when the compression determining process starts. This is because to execute the compressing process on which the latest determination result is reflected.

Subsequently, a process of the blog server 1 when there is an access request to the blog or the article therein will be described with reference to FIGS. 7 and 8.

When there is an access request from the user terminal 5, the blog server 1 progresses the process from step S301 to step S302, and determines whether or not the requested article is the article presently stored in a compressed status (the "compressed article" below).

When the article is not the compressed article, the blog server 1 progresses the process from the step S302 to step S303, and distributes the requested article in a normal scheme. That is, the webpage data on the corresponding article is read from the blog DB 51, and is transmitted to the user terminal 5. This enables the audience who is using the user terminal 5 to view a desired article.

When the article to which the access request is made is the compressed article, the blog server 1 progresses the process to step S304, and executes the decompressing process. That is, the data in the compressed status on the corresponding article is read from the blog DB 51, and the decompressing process is executed thereon. Next, the webpage data that has been decompressed is transmitted to the user terminal 5 in step S305. Hence, even if the article has been compressed, the audience who is using the user terminal 5 can view the desired article.

Note that when a part of the data on the article, in particular, the data other than the region to be appeared as the first view in the webpage data is compressed as described above, the blog server 1 can first transmit the uncompressed part of the article to the user terminal, execute the decompressing process on the compressed part during such a transmission, and transmit the data that has the decompression completed. This enables a distribution that does not cause the audience to feel the decompressing process time, and thus the service performance of the blog server 1 can be maintained.

Moreover, when, in addition to the compression on the part other than the first view, a part of the article is compressed, it is likewise desirable to first transmit the uncompressed part in the article.

Figure 8C:
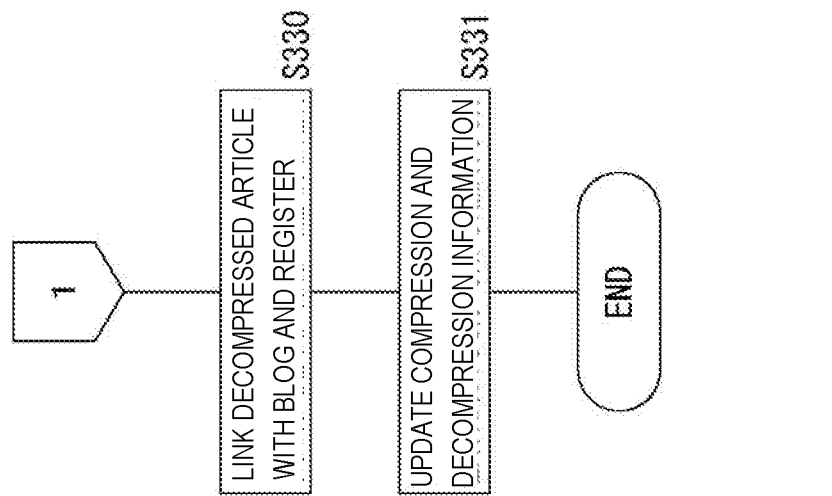
FIGS. 8A, 8B, and 8C are flowcharts of example processes after decompression according to the embodiment.
Figure 8B:
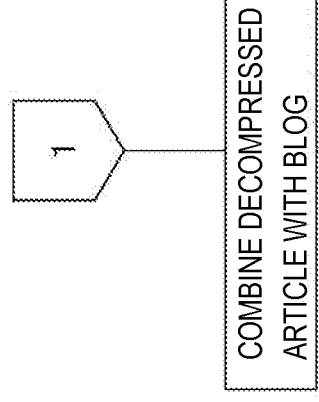
Figure 8A:
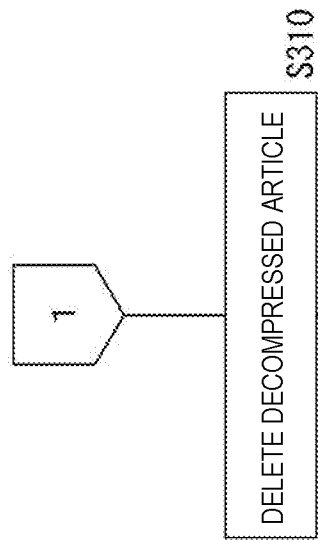

After the compressed article is decompressed and distributed, example processes as illustrated in FIG. 8A, FIG. 8B, and FIG. 8C are considerable.

Figure 7:
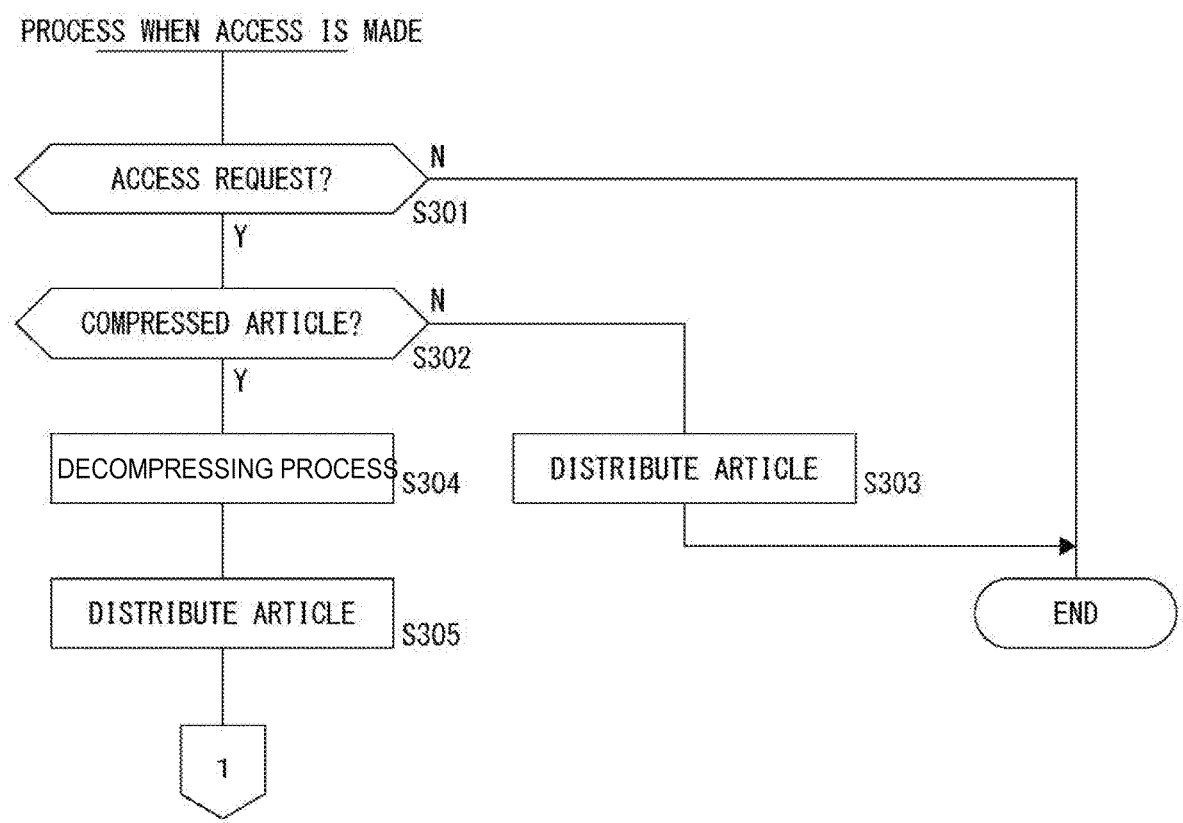
FIG. 7 is a flowchart of a process when an access is made according to the embodiment.

First, in the example case in which the process progresses to step S310 in FIG. 8A from the step S305 in FIG. 7, the blog server 1 does not store the decompressed article, i.e., the decompressed data on the compressed article, i.e., the distributed webpage data, and deletes such data.

This is based on an assumption that the present access request to such an article is an exceptional access, and this article still has the low accessibility and thus being compressed. Hence, the compressed article is stored as it is.

When a subsequent access occurs, the decompressing process is executed access by access. Although a decompressing process load is produced in accordance with the access request, since it can be considered that the number of accesses is small at all, an advantageous effect in storage resource can be maintained by storing such an article in the compressed status.

In contrast, an occurrence of the access to the compressed article can also be considered such that the accessibility for the compressed article (the article determined as having a low accessibility) may be increasing.

Hence, the example in which the process progresses to the step S320 in FIG. 8B from the step S305 in FIG. 7 is expected. The blog server 1 combines, in the step S320, the decompressed article data in the blog. Next, the compressed article is deleted in step S321. That is, instead of the compressed article combined in the blog so far, the data on the decompressed article (the decompressed article) is combined in the blog.

Note that the decompressed article data may be the same data as the original article data prior to the compression, but when a lossy compression is applied, the decompressed data becomes data with a lower quality than the original article data. That is, it is not always true that the decompressed data is exactly the same as the original article data. Hence, the decompressed article data after compression will be referred to as a "decompressed article".

The blog server 1 updates, in step S322, the compression and decompression information in the managing DB 53. That is, the information is updated in such a way that the corresponding article in the blog is the data on the article in the decompressed status from the compression (i.e., the decompressed article). Moreover, past-record information like the date and time of the decompression is added.

When the decompression is executed as described above, since the compressed article is replaced with the decompressed article, the data on the article can be distributed without a decompression when there is an access request subsequently.

Note that when the number of subsequent accesses to the decompressed article is small and the determination is made in the compression determining process in FIG. 5 that the accessibility is still low, such an article is compressed again by the compressing process in FIG. 6. Hence, when the article is still unpopular, the data on the article is compressed again, and thus there is no large disadvantage in comparison with the process in FIG. 8A in view of maintaining the storage resource.

Moreover, when the compressing process is executed by lossy compression, even if the data on the decompressed article decompressed by the subsequent decompressing process is stored, the occupied storage area in the blog DB 51 is smaller than a case in which the data is stored in an original and uncompressed status, thus advantageous.

FIG. 8C illustrates the example in which the decompressed article is stored together with the compressed article. When the process progresses to the step S330 in FIG. 8C from the step S305 in FIG. 7, the blog server 1 registers the decompressed data on the article in association with the blog. However, the compressed article is stored as it is. Next, the blog server 1 updates, in step S331, the compression and decompression information in the managing DB 53. That is, the information is updated so as to indicate that there is the decompressed article for the corresponding article in the blog. Moreover, the past-record information like the decompression date and time is added.

In this case, by storing the decompressed article, the data on the article can be distributed without the decompressing process when an access request is made subsequently.

However, by storing both the decompressed article and the compressed article, a load on the storage resource increases. Hence, for example, the decompressed article may be deleted after a certain time period has elapsed. This achieves a circumstance enabling a distribution without the decompressing process when an access is made again for a certain time period when there is the access request.

Moreover, when the compressed article and the decompressed article are both stored in this way, and when the article becomes the article to be compressed by the subsequent process in FIG. 5, in the compressing process in FIG. 6, a process of deleting the decompressed article may be executed.

4. Second Embodiment

As a second embodiment, another example that is equivalent to the above-described compression determining process in FIG. 5 will be described.

Figure 9A:
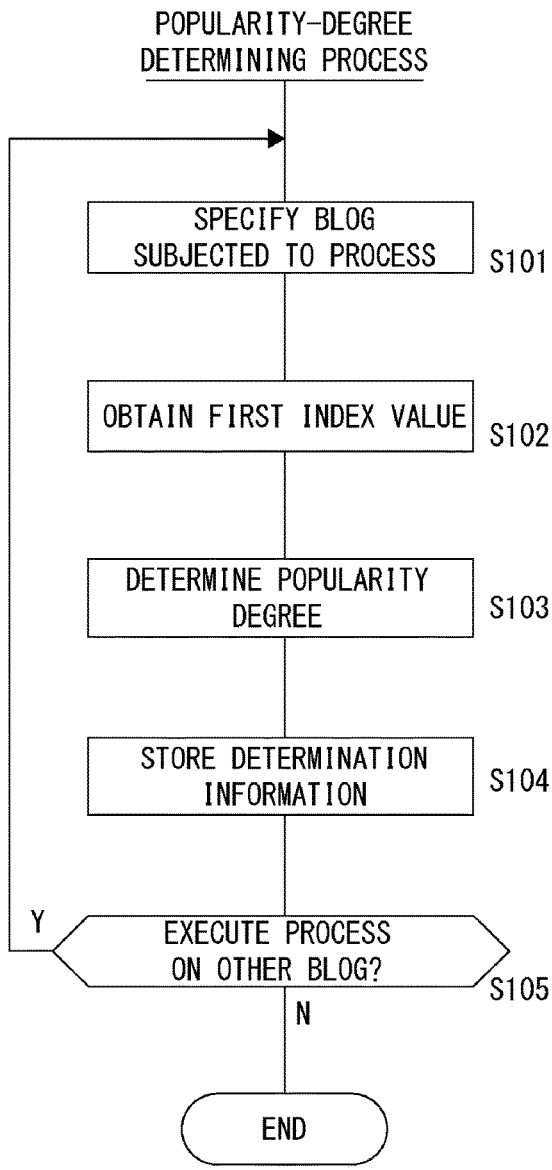
FIGS. 9A and 9B are flowcharts of a modified example of processes for compression determination according to a second embodiment.
Figure 9B:
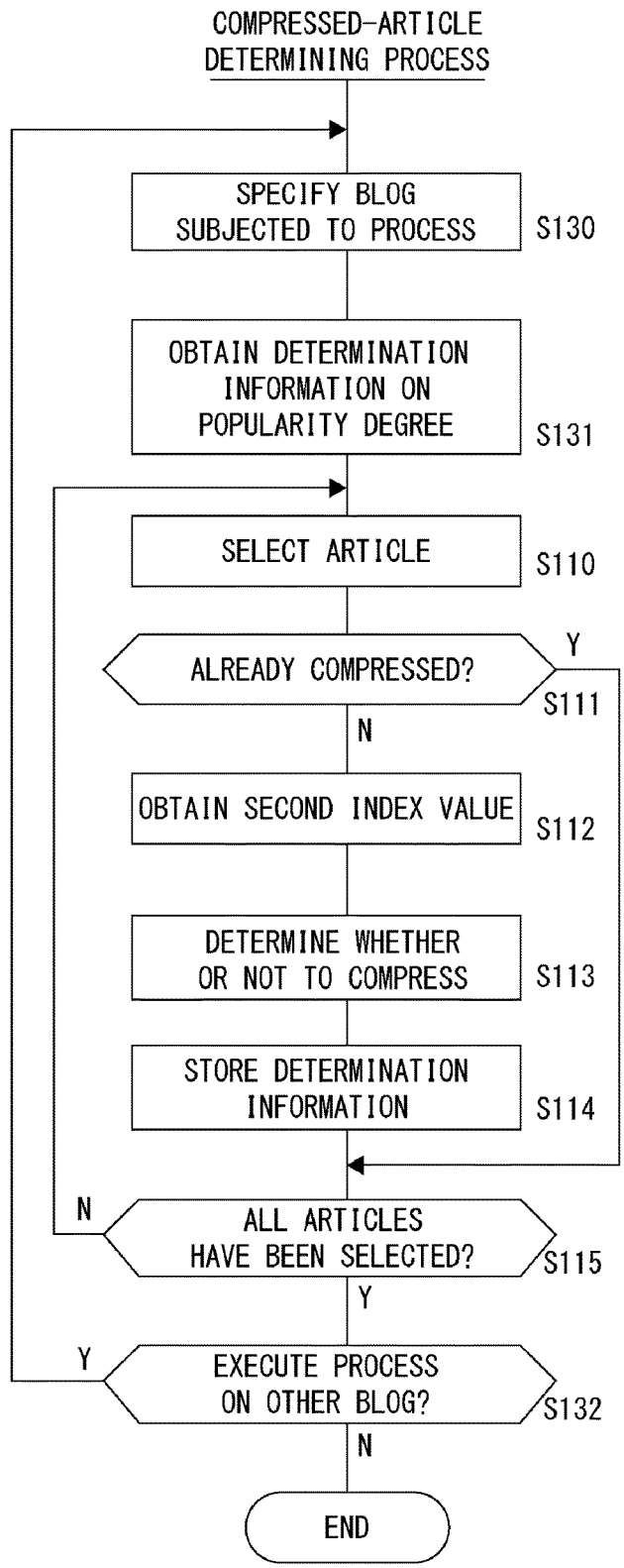

This is an example in which the blog server 1 executes, instead of the compression determining process in FIG. 5, a popularity-degree determining process in FIG. 9A and a compressed-article determining process in FIG. 9B.

FIG. 9A illustrates a process of determining a popularity degree for each blog.

The blog server 1 executes the popularity-degree determining process in FIG. 9A as needed on all of or some of the blogs that are stored in the blog DB 51.

The blog server 1 specifies, in the step S101, the one blog subjected to the popularity-degree determining process. The blog server 1 obtains, in the step S102, the first index value for the blog subjected to the process. For example, the first index value contained in the blog actual-achievement information stored for the blog (the blog ID) is read from the managing DB 53. The above steps S101 and S102 are the same as those in FIG. 5.

The blog server 1 executes, in the step S103, the popularity degree determination that utilizes the first index value for the blog. For example, the popularity degree is classified into any of a plurality of classes based on, for example, the number of page views.

Next, in the step S104, popularity-degree determination information for the blog is registered in the managing DB 53. For example, a value that indicates any of "popular/ordinary/unpopular" is registered as a kind of the determination information.

The blog server 1 checks, in the step S105, whether or not to subsequently execute the popularity degree determination on the other blog. When the similar process is to be executed on the other blog, the process returns to the step S101, the other one blog is specified as the blog subjected to the process, and then the similar processes are executed.

In contrast, when the process has been completed for all the blogs subjected to the process at this time, the popularity-degree determining process in FIG. 9A is terminated from the step S105.

The blog server 1 executes this popularity-degree determining process in FIG. 9A as needed. For example, the process is periodically executed for all the blogs stored in the blog DB 51. Hence, the popularity-degree determination information at the present time point for each blog is stored in the managing DB 53.

Moreover, the blog server 1 executes the compressed-article determining process in FIG. 9B as needed.

The blog server 1 specifies, in step S130, the one blog subjected to the compressed-article determining process.

The blog server 1 obtains, in step S131, the popularity-degree determination information on the blog subjected to the process from the managing DB 53.

Next, as the compression determination on each article of the blog, the processes in the steps S110 to S115 are executed. These are the similar processes to the steps S110 to S115 in FIG. 5.

At this time, in the determination on whether or not to compress in the step S113, the popularity-degree determination information already obtained is referred, and the determination reference on whether or not to compress in accordance with the accessibility is adjusted in accordance with the popularity degree.

This enables a determination on whether or not to compress the article that is hardly accessed with the popularity degree of the blog itself being taken into consideration.

When the determination on whether or not to compress has been completed for all the articles subjected to the process at this time in a given blog, it is checked, in step S132, whether or not to subsequently process the other blog. When the similar process is to be executed on the other blog, the process returns to the step S130, the other one blog is specified as the blog subjected to the process, and then the similar process is executed.

When, for example, the process has been completed on all the blogs subjected to the process at this time, the compressed-article determining process in FIG. 9B is terminated from the step S132.

Execution of the above-described processes illustrated in FIGS. 9A and 9B as needed by the blog server 1 enables a determination on the article to be compressed as needed. The article that is determined as compression permitted is to be compressed in the subsequent compressing process in FIG. 6.

According to this second embodiment, since the popularity-degree determining process and the compressed-article determining process are executed separately, the degree of freedom for scheduling of the process is enhanced.

This is appropriate when, for example, it is desirable to execute only the popularity-degree determining process at short intervals in order to cope with a keen popularity increase.

5. Third Embodiment

As a third embodiment, an example will be described in which the blog server 1 determines, for the article, whether or not to compress, and also determines whether or not to decompress the already-compressed article based on the first and second indexes.

Figure 10:
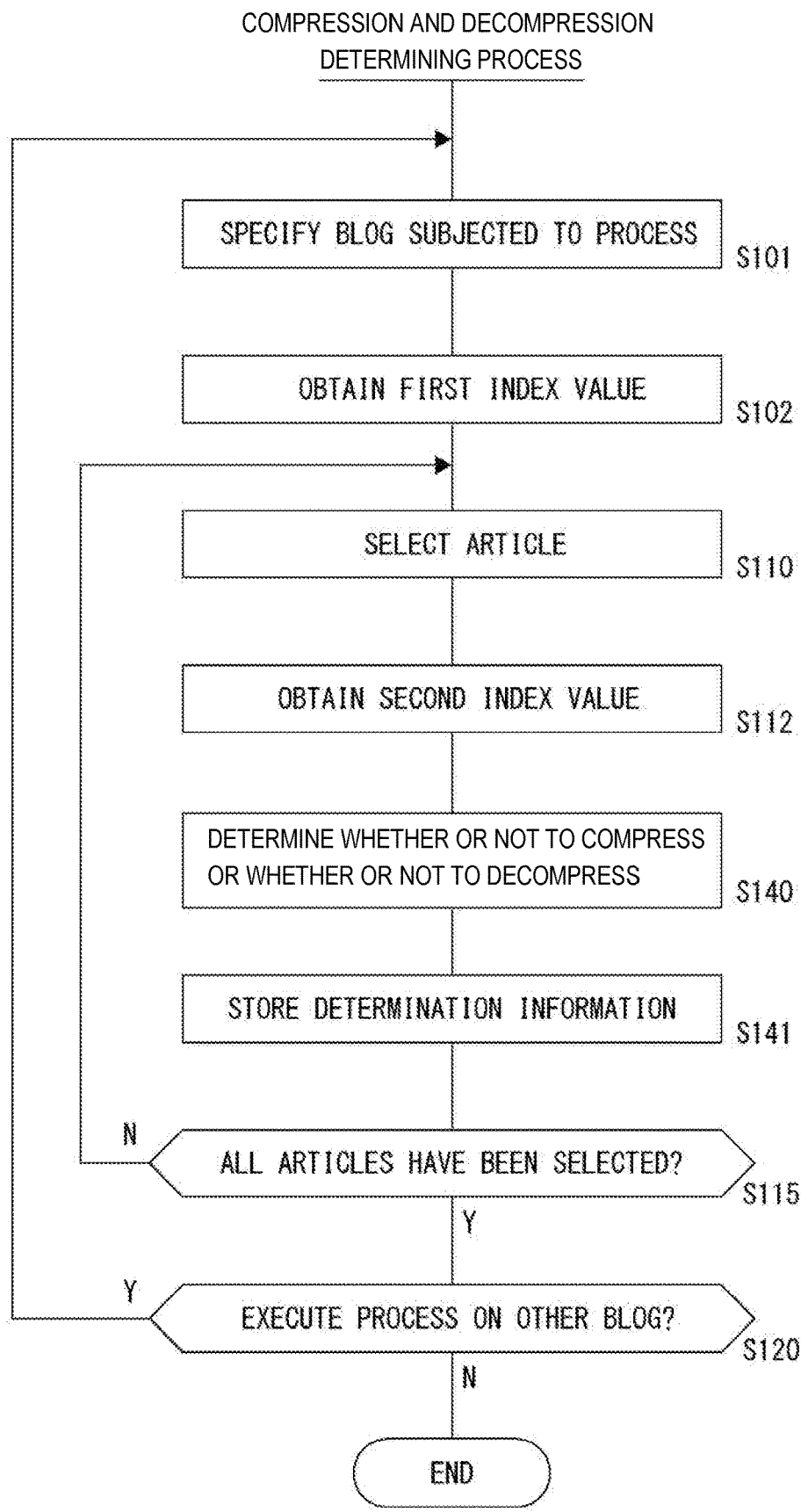
FIG. 10 is a flowchart of a compression and decompression determining process according to a third embodiment.

The blog server 1 executes, for example, a compression and decompression determining process in FIG. 10 periodically or at a predetermined timing. The process in FIG. 10 can be considered as a process instead of the compression determining process in FIG. 5 in the first embodiment. The same step number will be given to the same process in FIG. 5, and the duplicated description will be omitted.

The blog server 1 specifies the blog subjected to the process (S101), obtains the first index value (S102), and then executes a determination on each article in steps S110, S112, S140, S141, and S115.

In this case, the blog server 1 that has selected one article in the step S110, progresses the process to the step S112 and obtains the second index value regardless of whether or not the article has been already compressed. Next, whether or not to compress and whether or not to decompress are determined in the step S140.

That is, the blog server 1 determines, like the step S113 in FIG. 5, whether or not to compress for the uncompressed article or the decompressed article using the first and second index values.

In contrast, for the compressed article, the blog server 1 executes the determination on whether or not to decompress by utilizing the first index value and by the second index value. That is, the determination on whether or not to decompress is not made in accordance with the accessibility only of the article itself, but the popularity degree of the blog is determined in accordance with the first index value, and a determination on which the popularity degree index determination is reflected is made on whether or not to decompress.

For example, the popularity degree is classified into three classes, such as popular/ordinary/unpopular, like the determination on whether or not to compress by utilizing the first index value that is the total number of page views, etc.

Next, as the second index value, for example, the number of page views N for the article is utilized: and Unpopular blog: decompressed when the number of page views N is equal to or greater than N1;

Ordinary blog: decompressed when the number of page views N is equal to or greater than N2; and Popular blog: decompressed when the number of page views N is equal to or greater than N3.

However, N1>N2>N3.

That is, in the case of the compressed article of a popular blog, the decompression is permitted when the page view actual achievement has slightly increased. However, in the case of the compressed article of an unpopular blog, the determination is made with the threshold for permitting the decompression in accordance with the number of page views being increased. Hence, the article of the popular blog is likely to be permitted for decompression even once compressed. This is because that the accessibility is likely to increase in the case of the popular blog.

As another example, for example, as the second index value, a value K that indicates the increasing tendency of the page view for the article is utilized: and Unpopular blog: decompressed when the increasing tendency value K is equal to or greater than K1;

Ordinary blog: decompressed when the increasing tendency value K is equal to or greater than K2; and Popular blog: decompressed when the increasing tendency value K is equal to or greater than K3.

However, K1>K2>K3.

That is, in the case of the compressed article of a popular blog, when a slight increasing tendency of the page view is observed, the decompression is permitted. However, in the case of the compressed article of an unpopular blog, a determination is made such that the decompression is permitted when a remarkable increasing tendency of the page view is observed. In this case, also, the article of the popular blog is likely to be permitted for decompression even once compressed.

Next, the blog server 1 stores, in step S141, the determination on whether or not to compress or the determination on whether or not to decompress for the article as the determination information. For example, the flag that indicates compression permitted or unpermitted or the flag that indicates decompression permitted or unpermitted for the article is updated or maintained as the determination information in the managing DB 53.

The steps S115 and S120 are the same as those in FIG. 5.

Figure 11:
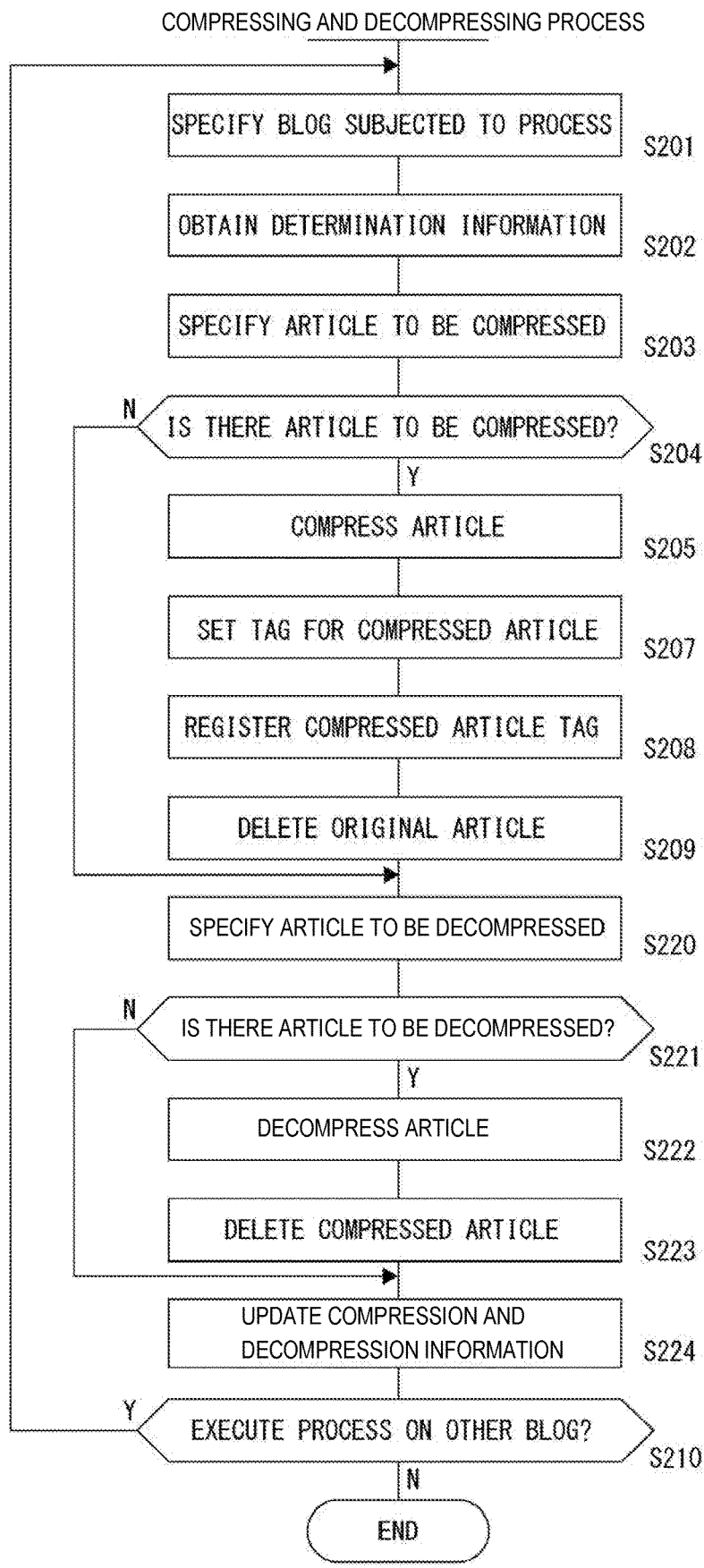
FIG. 11 is a flowchart of a compressing and decompressing process according to the third embodiment.

The blog server 1 also executes a compressing and decompressing process in FIG. 11 as needed. This is a process instead of the compressing process in FIG. 6 in the first embodiment. The same process as that in FIG. 6 will be denoted by the same step number, and the detailed explanation will be omitted.

The blog server 1 specifies, in the step S201, the blog subjected to the process, and obtains, in the step S202, the determination information.

The blog server 1 refers to, in the step S203, the determination information on whether or not to compress, and specifies the article to be compressed. Next, the process is branched at the step S204 based on the presence or absence of the article to be compressed.

When one or the plurality of articles is to be compressed, the blog server 1 executes, in the step S205, the compressing process on each data on the one or the plurality of articles, sets the tag for the compressed article, registers the tag, and deletes the original data on the article in the steps S207, S208, and S209 like the case illustrated in FIG. 5.

When the above steps S205 to S209 are executed, or when there is no article to be compressed in the step S204, the blog server 1 specifies, in step S220, the article to be decompressed. That is, with reference to the determination information obtained in the step S202, the article which should be decompressed among the compressed articles is specified. Next, the process is branched at step S221 based on the presence or absence of the article to be decompressed. When there is no article to be decompressed, the process progresses to step S224.

When one or the plurality of articles is specified as the articles to be decompressed, the blog server 1 executes, in step S222, the decompressing process on the one or plurality of specified articles. In this case, the decompressed article data is combined with the blog instead of the compressed article so far. Moreover, the blog server 1 deletes, in step S223, the compressed article.

This causes the compressed article in the blog to be returned to the decompressed article in accordance with the increase of accessibility.

The blog server 1 updates, in step S224, the compression and decompression information in the managing DB 53. In this case, the flag information is updated so as to indicate that the compressed article in the blog is in a compressed status. Moreover, the compression past-record is added. Furthermore, the flag information is updated so as to indicate that the decompressed article in the blog is in a decompressed status. Still further, the decompression past-record is added.

When completing the compression or decompression for the one blog through the above processes, the blog server 1 checks, in the step S210, whether or not to process the other blog.

Next, when the process has been completed for all the blogs subjected to the process at this time, the compressing and decompressing process in FIG. 11 is terminated from the step S210.

By executing the above compressing and decompressing process in FIG. 11, the actual compressing process on the article determined as compression permitted through the compression and decompression determining process in FIG. 10 and the actual decompressing process on the article determined as decompression permitted are executed. This achieves a recovery of the storage resource, and an execution of the decompression on the article that has the increasing accessibility, thereby improving the performance when the access is made.

When, for example, the article itself is updated such that regarding a given article of a blog, the describer of the blog changes the contents, or the audience posts a comment to the article, the accessibility to this article increases. According to the third embodiment, an operation of canceling the compression is achieved for such an article.

Accordingly, such an operation is perceived in advance, and the compressed status is canceled in advance for the article of the blog which has been already compressed but which has an increasing accessibility.

This enables a prompt distribution of the article without the decompressing process at a time point at which an actual access is made.

6. Fourth Embodiment

According to a fourth embodiment, an example in which the blog server 1 determines whether or not to decompress the already-compressed article based on the contents of the article will be described.

For example, regarding an article that mentions a certain theme, although such an article is not getting attention a lot at a time point at which the article is uploaded, the possibility such that the article is searched increases (i.e., the accessibility increases) few years later because any incident or event relating to the theme mentioned in the article occurs in the world, and the linked number to the article increases.

Hence, such a tide is perceived in advance, and for the article which has been already compressed but which has the increasing accessibility, the compressed status is canceled in advance.

This enables a prompt distribution of the article without the decompressing process at a time point at which the actual access request is made.

Figure 12:
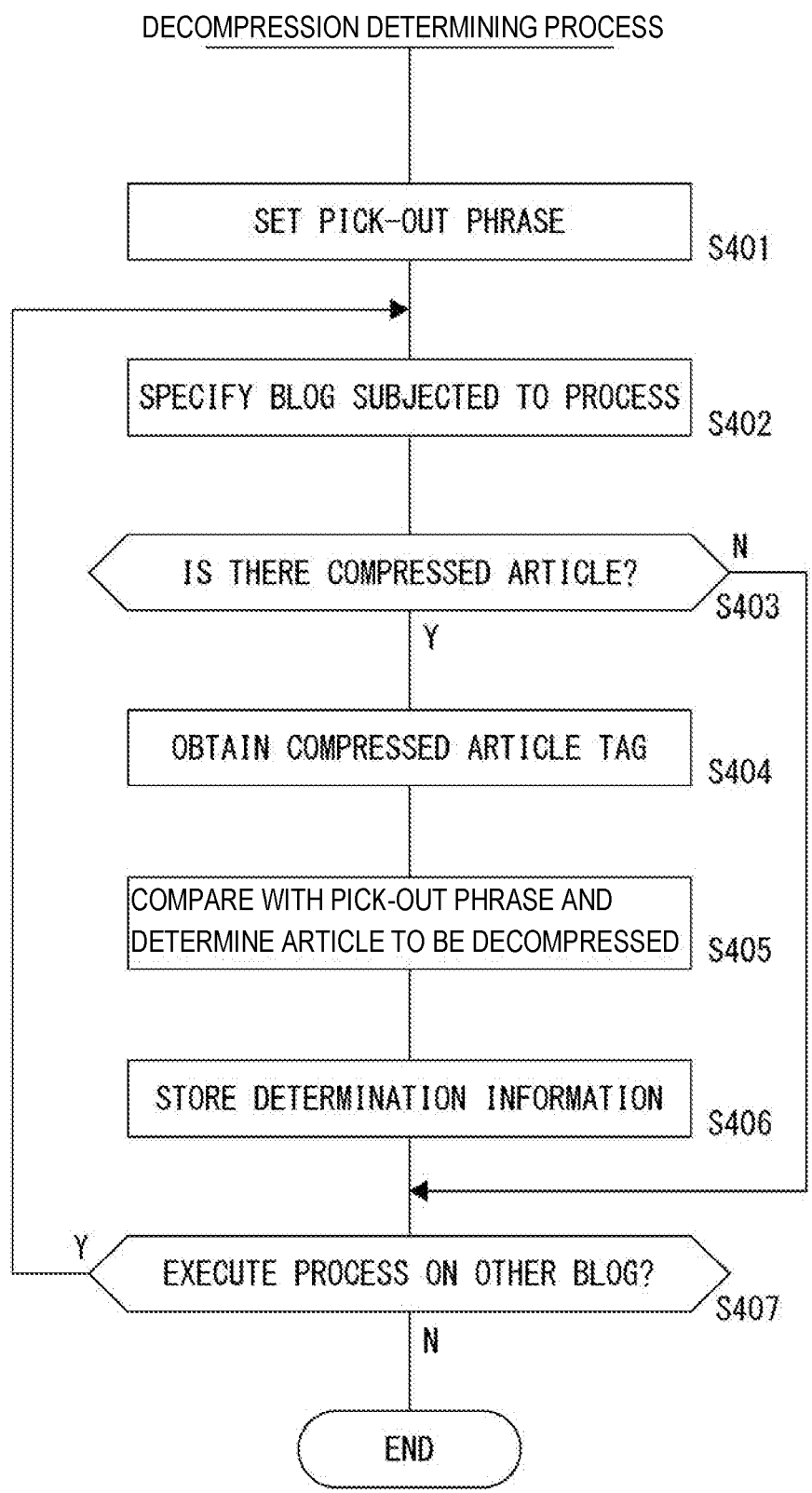
FIG. 12 is a flowchart of a decompression determining process according to a fourth embodiment.

FIG. 12 illustrates a decompression determining process. In addition to each process according to the first embodiment, the blog server 1 executes this decompression determining process periodically, etc., as needed.

The blog server 1 sets, in step S401, one or a plurality of pick-out phrases. For example, current-news words are set as the pick-out phrases. Examples are words frequently appearing in newspapers and news, words often used relating to entertainment, and fad words. Alternatively, a genre or relevant words that are in the news may be set as pick-out phrases. In the case of, for example, a time period at which the Olympics are being held, a genre "sport", the names of various games, the name of a player are set as the pick-out phrase.

The blog server 1 specifies, in step S402, one blog subjected to the process. Next, the blog server checks, in step S403, whether or not there is the compressed article in the specified blog. For example, the compression and decompression information in the managing DB 53 may be checked.

When there is no compressed article, since the determination on the decompression is unnecessary, the process progresses to step S407.

When the blog contains the compressed article, the blog server 1 progresses the process to step S404, and obtains the information on the compressed article tag for the blog from the managing DB 53. The compressed article tag contains tag information set for one or the plurality of compressed articles in a compressed status at least presently. That is, this is the tag information registered in the step S208 in FIG. 6, etc.

The blog server 1 compares, in step S405, the pick-out phrase set in the step S401 with the compression tag information obtained from the managing DB 53, and determines the article to be decompressed.

That is, the article that has the same or similar registered compressed article tag to the pick-out phrase is picked out, and is determined as the article to be decompressed.

The blog server 1 stores, in step S406, the determination information in the managing DB 53. That is, the information on the article determined as to be decompressed is stored.

When the decompression determining process for one blog completes through the above processes, the blog server 1 checks, in step S407, whether or not to execute the process on the other blog. When the process is to be executed on the other blog, the process returns to the step S402, the next blog to be processed is specified, and the processes subsequent to the step S403 are executed as described above.

When the process for all the blogs subjected to the process at this time has been completed, the decompression determining process in FIG. 12 is terminated from the step S407.

Figure 13:
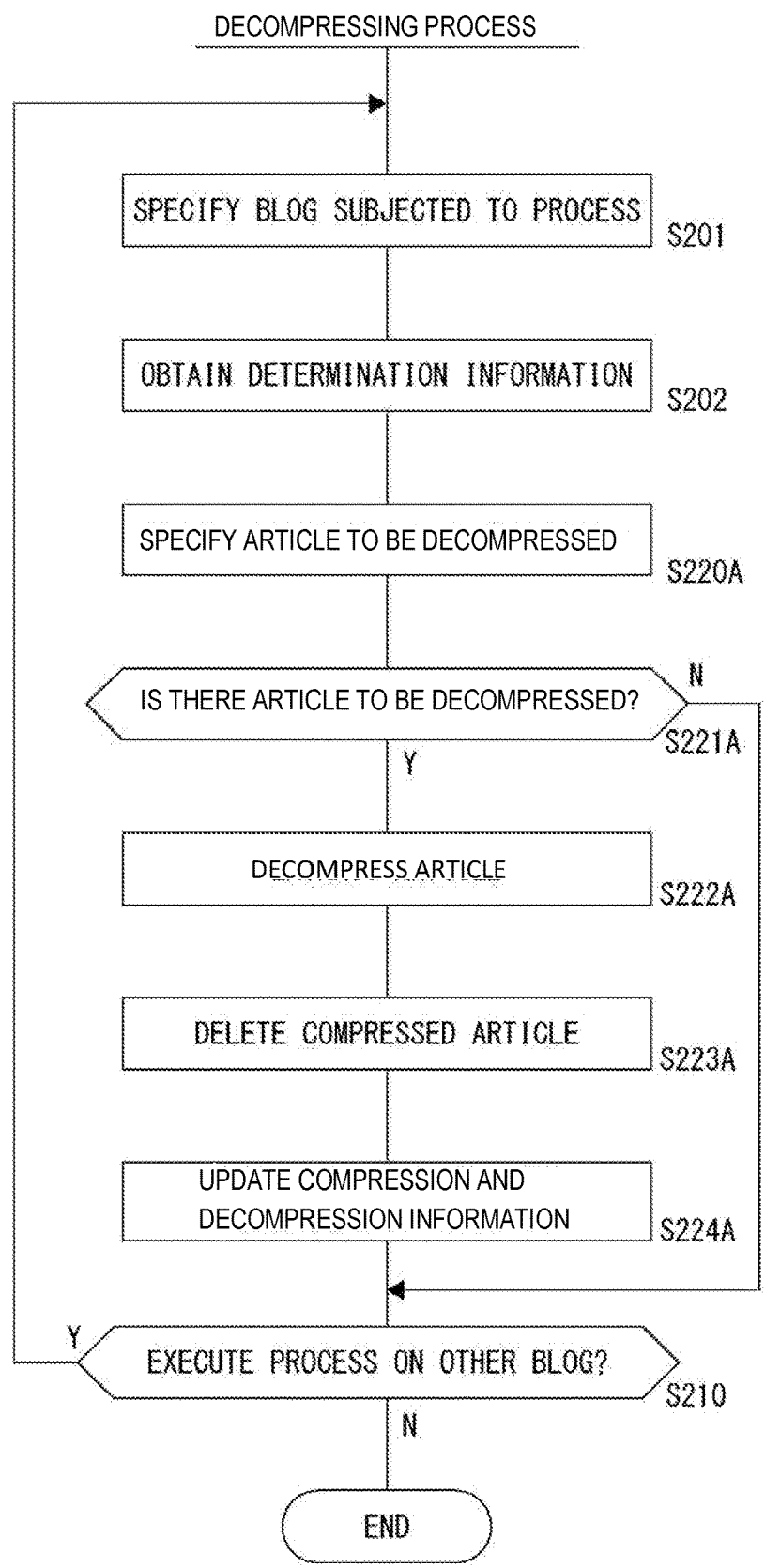
FIG. 13 is a flowchart of a decompressing process according to the fourth embodiment.

Together with this decompression determining process, the blog server 1 executes the decompressing process in FIG. 13 as needed.

The blog server 1 specifies, in the step S201, the blog subjected to the process, and obtains, in the step S202, the determination information.

The blog server 1 refers to, in step S220A, the obtained determination information, and specifies the article to be decompressed among the compressed articles. Next, the process is branched in step S221A based on the presence or absence of the article to be decompressed. When there is no article to be decompressed, the process progresses to the step S210.

When the one or plurality of articles is specified as the articles to be decompressed, the blog server 1 executes, in step S222A, the decompressing process on the one or plurality of specified articles. In this case, the decompressed article data is combined with the blog instead of the compressed article so far. Moreover, the blog server 1 deletes, in step S223A, the compressed article. Accordingly, the compressed article in the blog is returned to the decompressed article.

The blog server 1 updates, in step S224A, the compression and decompression information in the managing DB 53. In this case, the flag information is updated so as to indicate that the article that has been decompressed in the blog is in a decompressed status. Moreover, the decompression past-record is added.

When the decompressing process for one blog completes through the above processes, the blog server 1 checks, in the step S210, whether or not to execute the process on the other blog. When the process is to be executed, the process returns to the step S201, the other blog is specified, and the same processes are executed.

When the process for all the blogs subjected to the process at this time has been completed, the decompressing process in FIG. 13 is terminated from the step S210.

The actual decompressing process is executed on the article determined as decompression permitted in the decompression determining process in FIG. 12 through the above processes in FIG. 13.

Hence, the article that contains current-news words, fad words, and a theme for trend, etc., are predicted such that the accessibility thereto will increase, and is decompressed. This eliminates the necessity of the decompressing process when the number of accesses increases later.

7. Fifth Embodiment

According to a fifth embodiment, an example will be described in which, a change in the popularity degree of the blog is monitored, and when an increasing tendency of the popularity degree for a given blog is detected, the already-compressed article contained in such a blog is determined as the article to be decompressed. That is, regarding the blog that has an increasing popularity, the compressed article contained in the blog is directly set as the decompression permitted without an individual determination on each article.

Figure 14:
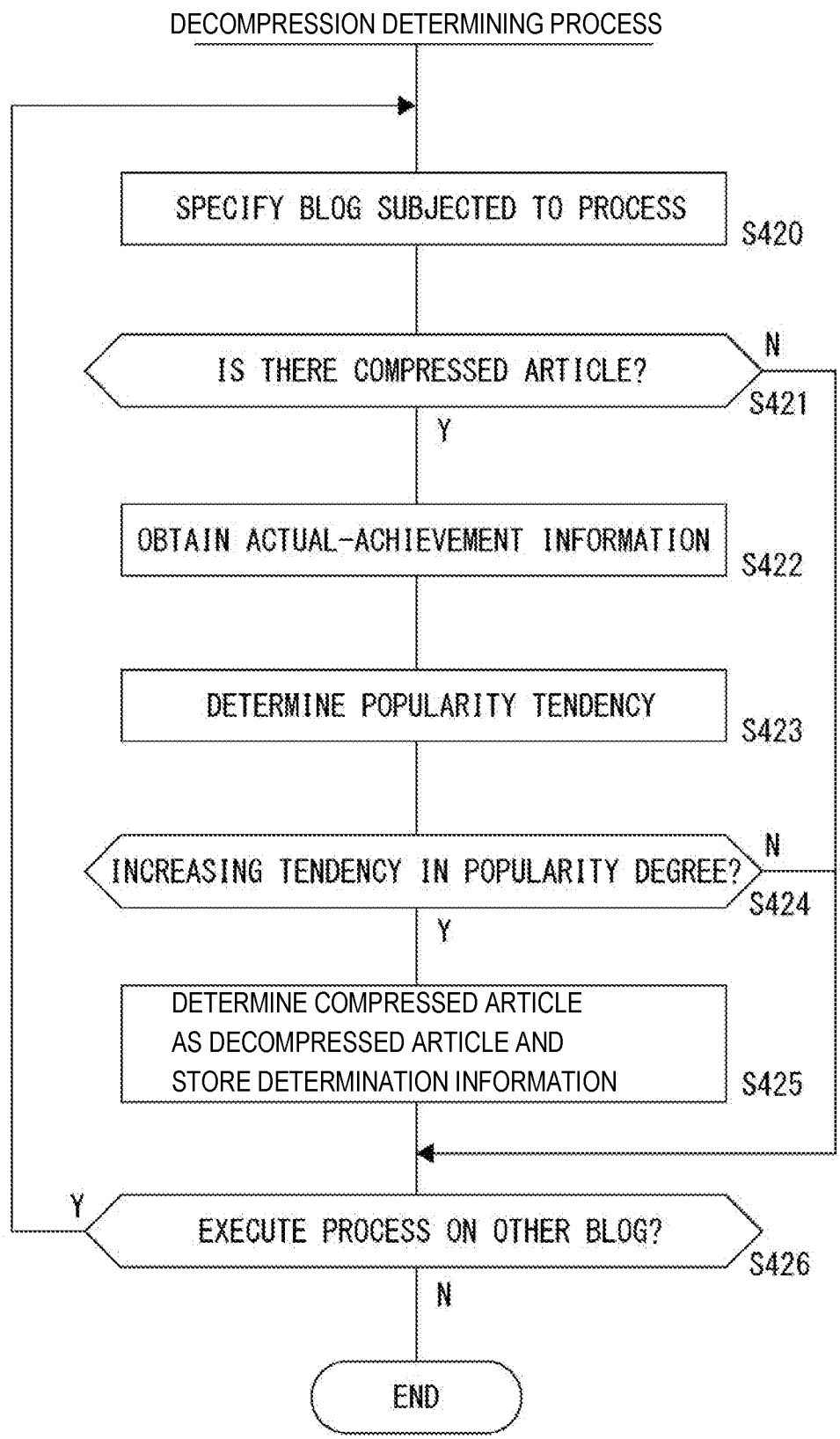
FIG. 14 is a flowchart of a decompression determining process according to a fifth embodiment.

FIG. 14 illustrates the decompression determining process in this case.

The blog server 1 specifies, in step S420, one blog subjected to the process. Next, the blog server refers to, in step S421, the compression and decompression information in the managing DB 53, and checks whether or not there is a compressed article in the specified blog.

When there is no compressed article, since the decompression determination is unnecessary, the process progresses to step S426.

When there is the compressed article in the blog, the blog server 1 progresses the process to step S422, and obtains the actual-achievement information on the blog from the managing DB 53.

For example, the information that becomes the first index value is obtained in this step, but in particular, information that can be referred as a value for each time period. That is, this is information enabling a determination on a change in popularity.

In the case of, for example, the total number of page views of the blog, the number of accessed unique users, the total linked number, and the total number of comments, etc., a value for each time period, such as day by day, or week by week, is suitable.

Moreover, the value that indicates the increasing tendency of the page view for the entire blog, and the value that indicates the increasing tendency of the data amount for the entire blog can be indexes that reflect a change in popularity. Thus, those values are suitable as the information obtained in the step S422.

The blog server 1 determines, in step S423, the popularity tendency of the blog from the above-described first index value. For example, a "popularity increasing tendency", "no change in popularity", a "popularity decreasing tendency", etc., are determined. Those can be determined from, for example, the values for each time period, such as the total number of page views and the number of unique users, the increasing tendency and the decreasing tendency of page views. It is appropriate if at least a determination on whether or not presently the blog has the increasing tendency in popularity is made.

When determining as "no change in popularity" or "popularity decreasing tendency", the blog server 1 progresses the process to the step S426 from the step S424, and when determining as "popularity increasing tendency", the blog server progresses the process to step S425.

The blog server 1 determines, in the step S425, one or the plurality of compressed articles contained in the blog as all decompression permitted, and stores the determination information, i.e., the information on the article determined as to be decompressed in the managing DB 53.

When the decompression determining process for one blog completes through the above processes, the blog server 1 checks, in the step S426, whether or not to execute the process on the other blog. When the process is to be executed, the process returns to the step S420, the next blog subjected to the process is specified, and the processes subsequent to the step S421 are executed as described above.

When the process has been completed for all the blogs subjected to the process at this time, the decompression determining process in FIG. 14 is terminated from the step S426.

Together with this decompression determining process, the blog server 1 executes the decompressing process in FIG. 13 or the compressing and decompressing process in FIG. 11 as needed. This causes the compressed article in the blog that has an increasing tendency in popularity to be decompressed.

Regarding the blog that has an increasing popularity, since all the articles have the increasing accessibility, the compressed articles are decompressed in advance. This eliminates the necessity of the decompressing process at the time of viewing, and achieves an improvement in response performance and a reduction of a process load at this time.

Note that at the time point that is the step S425 in FIG. 14, the decompression of the compressed article contained in the blog may be executed.

8. Sixth Embodiment

According to a sixth embodiment, an example will be described in which, when the compressed article is decompressed in accordance with an access, the blog server 1 determines, for a predetermined time period after the decompression, that this article is not to be compressed. For example, after the decompression is executed in accordance with an access as described with reference to FIG. 8B or FIG. 8C, when the decompressed article is stored, the compression determining process executed instead of the process in FIG. 5 is applied.

Figure 15:
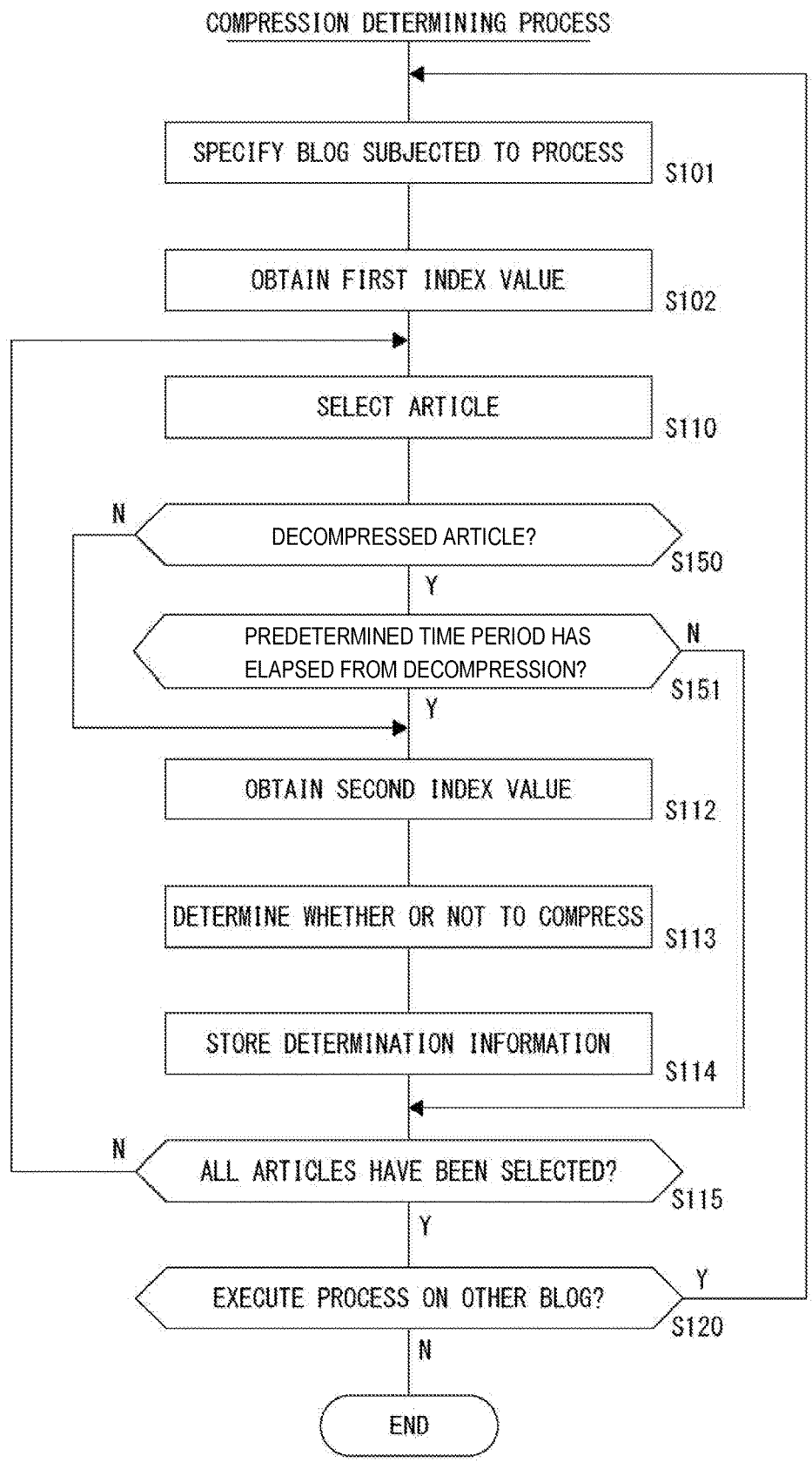
FIG. 15 is a flowchart of a compression determining process according to a sixth embodiment.

FIG. 15 illustrates the compression determining process according to the sixth embodiment. The same step number will be given to the same process as that of FIG. 5, and the duplicated description will be omitted.

In this compression determining process, also, the blog is specified in the step S101, the first index value is obtained in the step S102, and then the processes subsequent to the step S110 are executed on each article.

The blog server 1 first selects, in the step S110, the article subjected to the determination on whether or not to compress, and checks, in step S150, whether or not this article is the article (decompressed article) that is decompressed from the compressed status. This check can be made by, for example, referring to the compression and decompression information in the managing DB 53.

When the article is not the decompressed article, the process progresses to the subsequent step S112, and the similar process to FIG. 5 are executed.

In contrast, when the article is the decompressed article, the decompression date and time of this article is checked in step S151, and it is checked whether or not a predetermined time period has elapsed at the present time point. The predetermined time period is, for example, one month.

The check on the decompression date and time is executed with reference to the past-record information in the compression and decompression information in the managing DB 53. Note that in the case of the article having undergone compression and decompression by multiple times, the latest decompression date and time is checked.

Next, when the predetermined time period has elapsed from the decompression, the process progresses to the step S112, the second index value is obtained, and the determination on whether or not to compress using the first index value and the second index value is made in the step S113.

When the predetermined time period has not elapsed from the decompression, the process progresses to the step S115 without a determination on whether or not to compress.

Accordingly, regarding the decompressed article that is decompressed once after compressed, the determination with respect to the accessibility is not executed until the predetermined time period has elapsed from the decompression, and such an article is not determined as compression permitted.

Hence, during the predetermined time period after the decompression, when there is an access request, the distribution surely without the execution of the decompressing process is enabled.

Note that the process in the step S150 is based on the determination on whether or not the article is the decompressed article that is decompressed when the access is made as illustrated in FIG. 7. With respect to the access, in addition to the access from the user terminal 5 for viewing, for example, an access by a crawler may be made. The crawler in this case means a program (or an information processing device that executes an operation in accordance with the program) which periodically obtains text data and image data, etc., in various kinds of websites, and automatically constructs a DB. The access by this crawler does not contribute to a change in popularity degree or in accessibility for viewing.

Accordingly, when the decompression is executed in accordance with the access by the crawler, it is desirable to determine in the step S150 that the article is not the decompressed article. That is, in this case, even immediately after the decompression, the article is subjected to the determination on whether or not to compress.

Alternatively, when the decompression is executed in accordance with the access by the crawler, the decompressed article may be not stored as illustrated in FIG. 8A.

Furthermore, in the case of the access from the crawler, a scheme of not decompressing the compressed article at all is also considerable.

Although the crawler has been described as an example, the accesses other than the access that can be regarded as the intent of the user who is a general audience may be treated like the case of the crawler as described above.

9. Summary and Modified Examples

According to the above-described embodiments, the following effects are accomplished.

The blog server 1 as the information processing device according to the first to sixth embodiments includes: the first obtaining unit 12 that obtains the first index value which indicates the popularity degree of the blog containing one or a plurality of articles; the second obtaining unit 13 that obtains, for each of the plurality of articles contained in the blog, the second index value which indicates the accessibility to the article; and the determining unit 14 that determines whether or not to compress the article contained in the blog based on the first index value and on the second index value. These functions determine whether or not to compress through the processes in FIG. 5, FIG. 9A, FIG. 9B, FIG. 10, and FIG. 15.

By compressing the article that has a low accessibility, the storage-resource tightness of the server is avoidable. Hence, in such determination processes, in order to compress the article (e.g., an unpopular article) that has a low accessibility among the articles contained in the blog, a determination on whether or not to compress the article, i.e., whether or not the accessibility of the article is low is made. In this case, the determination on whether or not to compress is made in consideration of whether the article that has a low accessibility is the article in the popular blog or in the unpopular blog.

By determining whether or not to compress based on not only the index which indicates that the accessibility is low but also the index which indicates the popularity degree of the blog, the article that has a low accessibility in an unpopular blog is selected for compression as much as possible. Conversely, in the case of the article which has a low accessibility but which is contained in the popular blog, a determination that makes such an article not likely to be selected for compression is enabled.

In the case of, for example, the article in the popular blog, even if it is determined that the accessibility is low based on the actual achievement of the article itself, an access to such an article is expected in view of the relation with other articles, etc. That is, the unpopular article in the popular blog has a higher accessibility than that of the unpopular article in the unpopular blog. According to the processes of the embodiments, a determination that has not only the popularity of the article but also the popularity of the blog taken into consideration is enabled, and thus an appropriate article to be compressed is selectable.

Moreover, a compression and a decompression to the compression have a high process load, but according to these embodiments, the compression and the decompression are avoided as much as possible.

When an access is made to the compressed article, the blog server may decompress and distribute this article, but the article to be compressed for the storage resource is the article that has truly a low accessibility. Hence, an occasion in which the decompressing process is necessary when an access is made can be reduced as much as possible. This decreases the process load on the blog server 1 to provide the blog.

Moreover, by selectively compress the article that has truly a low accessibility, the load on the compressing process can be reduced.

In view of the foregoing, according to these embodiments, the compression of the article avoids the tight storage resource, and the appropriate article to be compressed in the blog is selectable so as to reduce the process occasion, such as compression or decompression, as much as possible. Moreover, the process load on the server can be reduced, and the performance at the time of viewing can be enhanced.

The blog server 1 according to the first to sixth embodiments includes the compressing and decompressing unit 15 which compresses the article determined by the determining unit 14 as to be compressed, and which decompress the already-compressed article when an access is made to this article.

That is, the article appropriately selected in accordance with the determination by the determining unit 14 in the processes in FIGS. 6 and 11 is compressed by the function of the compressing and decompressing unit 15. Moreover, even if the article that is determined as having a low accessibility is compressed, an access thereto may occur unsurprisingly. In such a case, the decompression is executed through the process in FIG. 7, and thus the article is appropriately provided to the accessing user.

This enables appropriate compression and decompression for avoiding the storage-resource tightness and for reducing the process load.

According to the third embodiment, whether or not to decompress the already-compressed article is determined based on the first index value and on the second index value (see FIG. 10).

That is, regarding the article that has been once compressed, the first and second index values are subsequently obtained periodically or irregularly, and thus a change in accessibility is checked. When the accessibility is increasing in the latest situation, the article is determined as to be decompressed.

Even if the article has been once compressed, by decompressing the article that has an increasing accessibility in advance, the necessity of the decompressing process when an access occurs is eliminated, the process load is reduced, enabling the user to view with comfort.

For example, with respect to the article in a given blog, when there is an update on the article itself or on the related contents, such as when the contents are changed by the author of the article, or when a reader posts a comment to the article, the accessibility to the article increases. Such an article is decompressed in advance, thereby eliminating the necessity of decompression when an access is made.

According to the fourth embodiment, whether or not to decompress the already-compressed article is determined based on the contents of the article (see FIG. 12).

For example, as the contents of the compressed article, the article that contains a certain set keyword or current-news word, the article with a specific theme, etc., are picked out, and these articles are determined as the articles to be decompressed.

For example, regarding a blog article that mentions a certain theme, although such an article is not getting attention a lot at a time point at which the article is initially uploaded, the possibility such that the article is searched increases (i.e., the accessibility increases) few years later because any incident or event relating to the theme mentioned in the article occurs in the world, and the linked number to the article increases.

Accordingly, such a tide is perceived in advance based on the contents of the article, more specifically, the current-news word, the set keyword, and the theme etc. of the article, and the article which has been already compressed but which has an increasing accessibility is decompressed from the compressed status.

This eliminates the necessity of the decompressing process at the time point at which the actual access is made, enabling a prompt distribution of the article.

Note that regarding the compressed article, it becomes difficult to search the contents. Accordingly, the managing DB 53 stores the tag information as the compressed article tag that indicates a keyword and a theme, etc. This facilitates and enables an appropriate decompression determination.

Moreover, tag setting and the tag registration in the managing DB 53 are executed at the time of the compression (see FIG. 6 and FIG. 11). This causes the execution of the processes of setting and registering the tag to be minimum requisite. Hence, an increase in process load is suppressed, and the waste consumption of the storage resource immoderately is avoided.

According to the fifth embodiment, a change in the popularity degree of the blog is monitored, and when an increasing tendency of the popularity degree for a given blog is detected, the already-compressed article in the blog is determined as the article to be decompressed (see FIG. 14).

When the number of accesses to a given blog remarkably increases because of a certain popular article, the other articles contained in this blog have an increasing accessibility in future although not accessed so far. Hence, all the compressed articles in the blog are determined as the articles to be decompressed.

This eliminates the necessity of the decompressing process at a time point at which the actual access is made, and enables a distribution of the article with an excellent response performance.

Note that as a modified example of the process in FIG. 14 according to the fifth embodiment, not all the compressed articles but some compressed articles in the blog determined as the popularity increasing may be determined as the articles to be decompressed. When, for example, the article that has the posted date and time within a predetermined time period in past from the present moment is determined as the article to be decompressed, the large number of articles are not decompressed immoderately, thus suitable to maintain the storage resource. For example, regarding the blog which has a large number of articles posted for a long time, and which has a large number of compressed articles that are relatively old, it is preferable that not all the compressed articles but some compressed articles should be determined as the articles to be decompressed.

Alternatively, when the number of compressed articles is equal to or greater than a predetermined number, only some (e.g., a half) articles may be determined as the articles to be decompressed.

Moreover, when the upper limit of the number of articles to be decompressed is set and there are the compressed articles beyond the upper limit, the articles up to the upper limit number may be determined as the article to be decompressed from the article that has a newer posted date and time.

According to the sixth embodiment, when the compressed article is decompressed in accordance with an access, such an article is not determined as the article to be compressed for a predetermined time period after the decompression (see FIG. 15).

When there is an access after the compression and the article is decompressed and distributed, the article can be regarded such that the accessibility is increasing. Accordingly, the article is decompressed as it is, eliminating the necessity of the decompressing process when the next access is made.

However, the access may be sporadic, and the article may be still unpopular. Hence, after the predetermined time period has elapsed, when the accessibility is low through the determination based on the first and second index values, the article may be compressed. This can address a case in which a waste storage resource is consumed by leaving the article as being decompressed, the necessary storage capacity is reduced, and thus the storage-resource tightness is avoidable.

The example processes in the above-described embodiments are merely examples, and other various kinds of modified examples are expectable.

When the popularity degree of the blog is classified into multiple classes, e.g., equal to or greater than three classes, regarding the blog that is determined as having the popularity in the lowest ranking, all the articles may be determined as compression permitted. That is, this is an example in which the determination on whether or not to compress is made for each article based on the first index value and the second index value with respect to a popularity between a first level (popularity high) and an (n−1)-th level (popularity low) with the popularity degree being classified into n classes. For the blog in an n-th level (popularity lowest), however, all the articles are determined as compression permitted without a determination on individual article.

In particular, as for the blog which has no access (viewing and comment writing) of an audience, and which has no update by the describer for a long time, such a blog can be regarded as substantially not utilized at all. Such a blog may be determined as the blog with the lowest popularity as described above.

This improves the process efficiency of the blog server 1, reduces the process load, and ensures the storage resource.

The compressing process may be executed multiple times step by step.

For example, the determination on the accessibility is still made on the compressed article as illustrated in FIG. 10. Next, the article which has been already compressed and which has no access for a predetermined time period may be compressed at a higher compression percentage.

For example, in the first-time compression, the compression is executed with the compression percentage that is 20%, in the second-time compression, the compression is executed with the compression percentage that is 50%, and in the third-time compression, the compression is executed with the compression percentage that is 80%.

Moreover, there is also an example in which the first-time compression is a lossless compression, and the second-time compression is a lossy compression.

Furthermore, the first-time compression may be a partial compression on the article, and the second-time compression may be an entire compression on the article.

Still further, the first-time compression may be a compression on only the text in the article, and the second-time compression may be a compression on the image in addition to the text.

Yet still further, the first-time compression may be a compression on only the image in the article, and the second-time compression may be a compression on the text in addition to the image.

Some blogs may be excluded from the blog subjected to the compression determining process.

For example, regarding the blog that is determined as highly popular for a long time, the article contained in this blog may be excluded from the article subjected to the compression determination. This reduces the number of blogs subjected to the processes as illustrated in FIG. 5, FIG. 10, and FIG. 15, etc., making the process efficient.

Similarly, the blog determined that all the articles have been already compressed, in particular, determined as quite unpopular (substantially not utilized at all) as described above may be excluded from the blog subjected to the decompression determination. This reduces the number of blogs subjected to the processes as illustrated in FIG. 10, FIG. 12, and FIG. 14, etc., and making the process efficient.

The plurality of first index values may be applied for the determination on the popularity degree of the blog.

Similarly, the plurality of second index values may be applied for the determination on the accessibility of the article.

Note that in the above-described embodiments, the process which is for a so-called blog and an article contained in the blog, and which compresses the article has been described. Such a technology is also applicable to a folder in a file system and a file contained in the folder.

That is, the popularity degree for the folder is converted into a fact whether or not the folder is frequently utilized so as to evaluate the popularity degree of the folder, and a determination on which such an evaluation is reflected is made on whether or not to compress the file with reference to the accessibility of the file.

Moreover, the blog may be a system achieved as a so-called cloud storage.

10. Program and Storage Medium

A program according to an embodiment causes an information processing device (e.g., a CPU) to execute the processes of at least the first obtaining unit 12, the second obtaining unit 13, and the determining unit 14 in the blog server 1.

The program according to the embodiment causes an information processing device to execute: a step (S102) of obtaining the first index value that indicates the popularity degree of the blog which contains a plurality of articles; a step (S112) of obtaining the second index value that indicates the accessibility to the article for each of the plurality of articles contained in the blog; and a step (S113 or S140) of determining whether or not to compress the article contained in the blog based on the first index value and on the second index value.

That is, this program causes the information processing device to execute the processes as described with reference to FIG. 5, FIG. 10, and FIG. 15, etc.

Such a program enables an achievement of one or a plurality of the information processing devices as the above-described blog server 1.

Moreover, such a program may be stored in advance in an HDD that is a storage medium built in an apparatus like a computer apparatus, a ROM in a microcomputer that has a CPU, or the like. Alternatively, the program may be temporarily or permanently recorded (stored) in a removable storage medium, such as a semiconductor memory, a memory card, an optical disk, a magneto-optical disc, or a magnetic disk. Furthermore, such a removable storage medium can be provided as a so-called package software.

Still further, such a program may be installed in a personal computer, etc., from the removable storage medium, and also downloadable via a network, such as a LAN or the Internet, from a download site.

REFERENCE SIGNS LIST

1 Blog server, 2 Network, 5 User terminal, 11 Blog managing unit, 12 First obtaining unit, 13 Second obtaining unit, 14 Determining unit, 15 Compressing and decompressing unit, 51 Blog DB, 52 Image DB, 53 Managing DB

The invention claimed is:

1. An information processing device comprising:
at least one memory configured to store computer program code;
at least one processor configured to access said computer program code and operate as instructed by said computer program code, said computer program code including:
first obtaining code configured to cause at least one of said at least one processor to obtain a first index value which indicates a popularity degree of a blog containing one or a plurality of articles;
second obtaining code configured to cause at least one of said at least one processor to obtain, for each of the plurality of articles value which indicates an accessibility to the article;
determining code configured to cause at least one of said at least one processor to determine whether or not to compress the article contained in the blog based on the first index value and the second index value; and
compressing and decompressing code configured to cause at least one of said at least one processor to compress the article determined by the determining code as to be compressed, and to decompress the already-compressed article when an access is made to the already-compressed article,
wherein the determining code is configured to set a determination reference in accordance with the first index value, and determine whether or not to compress the article based on the second index value with reference to the determination reference.

2. The information processing device according to claim 1, wherein
the determining code is configured to cause at least one of said at least one processor to determine whether or not to decompress the already-compressed article based on the first index value and on the second index value.

3. The information processing device according to claim 1, wherein
the determining code is configured to cause at least one of said at least one processor to determine whether or not to decompress the already-compressed article based on contents of the article.

4. The information processing device according to claim 1, wherein
the determining code is configured to cause at least one of said at least one processor to monitor a change in the popularity degree of the blog, and when an increasing tendency of the popularity degree for a given blog is detected, determine all of or some of the already-compressed articles in the blog as the articles to be decompressed.

5. The information processing device according to claim 1, wherein
the determining code is configured to cause at least one of said at least one processor to determine that, when the compressed article is decompressed in accordance with an access, the decompressed article is not the article to be compressed for a predetermined time period from the decompression.

6. The information processing device according to claim 1, wherein
the first index value is a value obtained based on at least one of the followings: a total number of page views for the entire blog; a number of unique users who have accessed the blog; a total linked number set to the blog; a total number of comments described in the blog; a value that indicates a page ranking of the blog; a value that indicates an increasing tendency of the page view for the entire blog; and a value that indicates an increasing tendency of a data amount for the entire blog.

7. The information processing device according to claim 1, wherein
the second index value is a value obtained based on at least one of the followings: a number of page views for each article; a number of unique users who have accessed the article; a linked number set to the article; a value that indicates a page ranking of the article; a value that indicates an increasing tendency of the page view for the article; a value that indicates a length of a time period at which there is no access to the article; and a value that indicates a presence or absence of a specific phrase.

8. An information processing method comprising:
obtaining a first index value that indicates a popularity degree of a blog which contains one or a plurality of articles;
obtaining a second index value that indicates an accessibility to the article for each of the plurality of articles contained in the blog;
determining whether or not to compress the article contained in the blog based on the first index value and on the second index value; and
performing compression based on the determination, and decompressing the already-compressed article when an access is made to the already-compressed article,
wherein the determining whether or not to compress the article comprises setting a determination reference in accordance with the first index value, and determining whether or not to compress the article based on the second index value with reference to the determination reference.

9. A non-transitory computer readable storage medium having stored thereon a computer program that causes an information processing device to:
obtain a first index value that indicates a popularity degree of a blog which contains one or a plurality of articles;
obtain a second index value that indicates an accessibility to the article for each of the plurality of articles contained in the blog;
determine whether or not to compress the article contained in the blog based on the first index value and on the second index value; and
perform compression based on the determination, and decompress the already-compressed article when an access is made to the already-compressed article,
wherein the information processing device is caused to set a determination reference in accordance with the first index value, and determine whether or not to compress the article based on the second index value with reference to the determination reference.

* * * * *